(12) United States Patent
Ue et al.

(10) Patent No.: US 10,554,873 B2
(45) Date of Patent: Feb. 4, 2020

(54) CAMERA SYSTEM AND COMMUNICATION METHOD

(71) Applicant: PANASONIC INTELLECTUAL PROPERTY MANAGEMENT CO., LTD., Osaka (JP)

(72) Inventors: Chikashi Ue, Fukuoka (JP); Toshiyuki Hamasaki, Fukuoka (JP); Noriaki Kido, Fukuoka (JP); Yuuji Yoshida, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/318,219

(22) PCT Filed: Nov. 30, 2016

(86) PCT No.: PCT/JP2016/085490
§ 371 (c)(1),
(2) Date: Jan. 16, 2019

(87) PCT Pub. No.: WO2018/042687
PCT Pub. Date: Mar. 8, 2018

(65) Prior Publication Data
US 2019/0158758 A1 May 23, 2019

(30) Foreign Application Priority Data
Sep. 1, 2016 (JP) .................. 2016-171219

(51) Int. Cl.
*H04N 5/232* (2006.01)
*H04W 40/36* (2009.01)
(Continued)

(52) U.S. Cl.
CPC ........ *H04N 5/232061* (2018.08); *H04M 9/00* (2013.01); *H04M 11/00* (2013.01);
(Continued)

(58) Field of Classification Search
CPC .. H04N 5/232061; H04N 21/64; H04N 7/186; H04W 80/04; H04W 40/36; H04M 11/025; H04M 9/00; H04M 11/00
See application file for complete search history.

(56) References Cited

U.S. PATENT DOCUMENTS

2011/0237254 A1* 9/2011 Lee ...................... H04N 21/234
455/435.2
2015/0339912 A1* 11/2015 Farrand ................ G08B 25/001
340/501
(Continued)

FOREIGN PATENT DOCUMENTS

| JP | 2009-206650 | 9/2009 |
|---|---|---|
| JP | 2014-200056 | 10/2014 |
| JP | 2016-100734 | 5/2016 |

OTHER PUBLICATIONS

International Search Report (ISR) from International Searching Authority (Japan Patent Office) in International Pat. Appl. No. PCT/JP2016/085490, dated Feb. 14, 2017.

*Primary Examiner* — Stella L. Woo
(74) *Attorney, Agent, or Firm* — Greenblum & Bernstein, P.L.C.

(57) ABSTRACT

A camera system comprising a camera and a hub connected to the camera, wherein the camera system allows handing over while the hub and a portable terminal device (smart phone) are communicating via a router. This camera system adopts a configuration provided with a DECT camera for transmitting media data that includes audio data and/or video data, and a hub for receiving the media data transmitted from the DECT camera, periodically receiving an IP
(Continued)

address notification from a previously correlated smart phone, and transmitting the media data to the transmission source of the latest of the IP address notification.

6 Claims, 18 Drawing Sheets

(51) Int. Cl.
*H04M 11/00* (2006.01)
*H04M 9/00* (2006.01)
*H04M 11/02* (2006.01)
*H04N 21/64* (2011.01)
*H04W 80/04* (2009.01)

(52) U.S. Cl.
CPC .......... *H04M 11/025* (2013.01); *H04N 21/64* (2013.01); *H04W 40/36* (2013.01); *H04W 80/04* (2013.01)

(56) References Cited

U.S. PATENT DOCUMENTS

| | | |
|---|---|---|
| 2016/0148476 A1 | 5/2016 | Wakeyama et al. |
| 2018/0234439 A1* | 8/2018 | Heuser ................ H04L 63/1416 |

\* cited by examiner

CAMERA SYSTEM AND COMMUNICATION METHOD

TECHNICAL FIELD

The present disclosure relates to a camera system and a communication method.

BACKGROUND ART

Conventionally, for a house or the like, a camera system including a camera installed at an entrance located inside or outside the house and a hub installed inside the house and connected to the camera has been widely used, for example.

PTL 1 discloses a system in which a master is connected to a public network such as the Internet via an adapter and a router and a cellular phone is connected to the public network. In such a system, when a call has arrived from a slave with a camera, the slave and the cellular phone can communicate with each other via the master, the adapter, the router, and the like.

CITATION LIST

Patent Literature

PTL 1
Japanese Patent Application Laid-Open No. 2014-200056

SUMMARY OF INVENTION

Technical Problem

In a general mobile communication system, when a user of a cellular phone is traveling by car or train, handover takes place in which a router (radio base station) to which the cellular phone has been connected is switched over to a different router, and the different router takes over the communication. However, for the system disclosed in PTL 1, handover during communication between a master (hub) and a cellular phone via a router has not been studied.

It is an object of the present disclosure is to provide a camera system that allows handover during communication between a hub and a mobile terminal apparatus, and a communication method of the camera system.

Solution to Problem

A camera system according to an aspect of the present disclosure includes: an imaging apparatus that transmits media data including audio data and/or video data; and a communication apparatus that receives the media data transmitted from the imaging apparatus, periodically receives an IP address notification from a mobile terminal apparatus preliminarily associated with the communication apparatus, and transmits the media data to a transmission source of the IP address notification received most recently.

Advantageous Effects of Invention

According to the present disclosure, handover can be performed during communication between a communication apparatus and a mobile terminal apparatus via a router.

DESCRIPTION OF EMBODIMENTS

Figure 1:
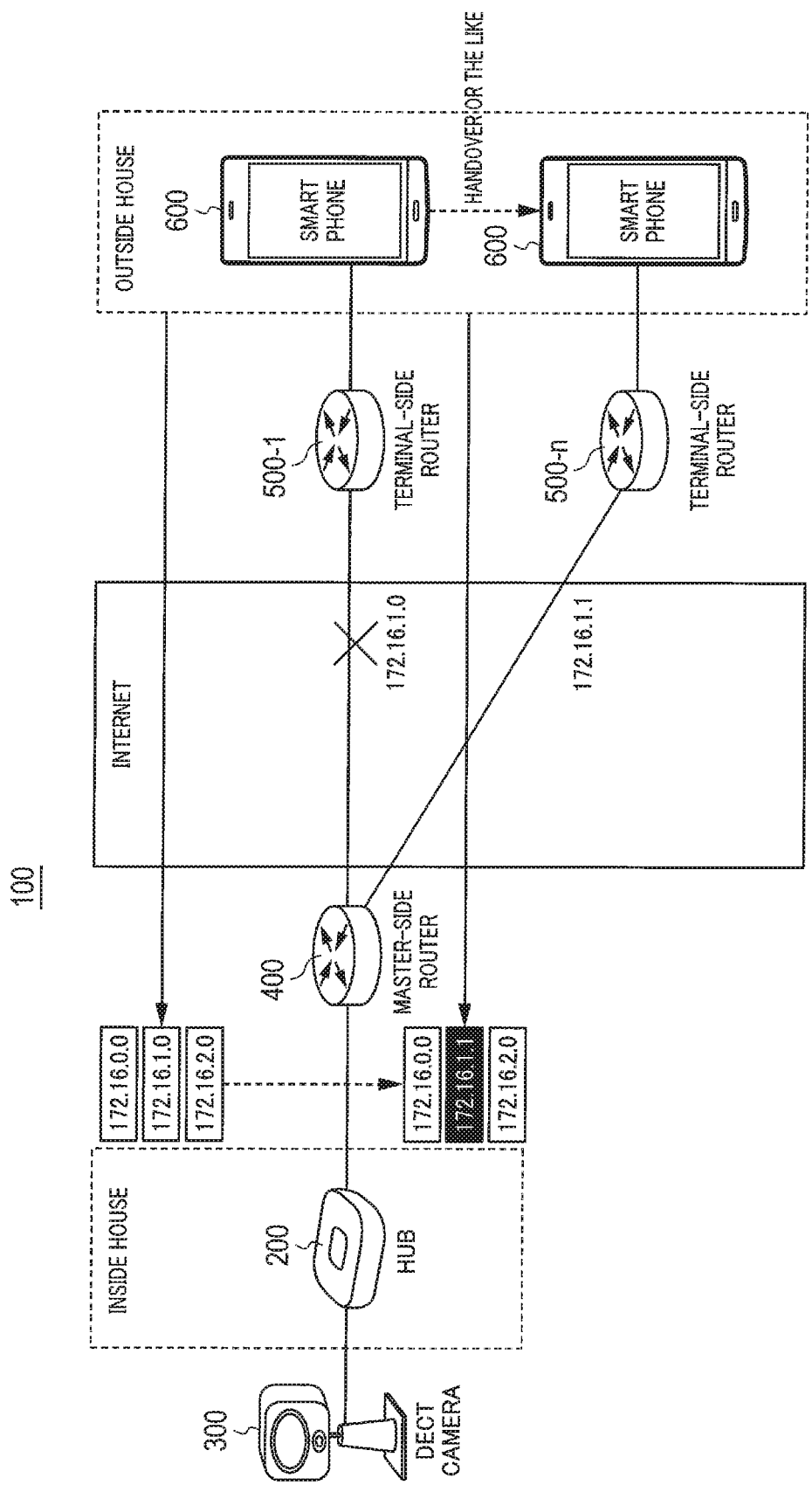
FIG. 1 is a schematic diagram illustrating a configuration of a camera system according to Embodiment 1 of the present disclosure.

Hereinafter, embodiments of the present disclosure will be described in detail with reference to the drawings. However, in the embodiments, the same reference numerals are given to the components having the same function, and duplicate explanation will be omitted.

Embodiment 1

<System Overview>

FIG. 1 is a schematic diagram illustrating a configuration of camera system 100 according to Embodiment 1 of the present disclosure. As illustrated in FIG. 1, camera system 100 includes hub 200, DECT camera 300, master-side router 400, terminal-side routers 500-1 to 500-$n$ ($n$ is 1 or more), and smartphone 600 as a mobile terminal apparatus. Note that master-side router 400 and terminal-side routers 500-1 to 500-$n$ are connected over a public network (here, the Internet).

Hub 200 is connected to DECT camera 300 by wire or radio and communicates with DECT camera 300 using a communication system based on digital enhanced cordless telecommunications (DECT). Hub 200 transmits and receives audio data and control data to and from DECT camera 300, and receives video data from DECT camera 300. Further, hub 200 is connected to master-side router 400 by wire or radio and is connected to terminal-side router 500 via master-side router 400 and over the Internet. Upon receiving a call signal from DECT camera 300, hub 200 transmits an incoming call notification to master-side router 400. Hub 200 manages an IP address notification transmitted from smartphone 600 and transmits media data including the audio data, the video data, and the like to a transmission source of the IP address notification. Note that, in the present embodiment, it is assumed that hub 200 is connected to DECT camera 300 by wire and is connected to master-side router 400 by radio.

DECT camera 300 is connected to hub 200 and communicates with hub 200 using the communication system based on DECT. DECT camera 300 transmits and receives the audio data and the control data to and from hub 200. When a built-in motion detection sensor detects a moving object, DECT camera 300 transmits the call signal to hub 200, starts taking images, and transmits the video data to hub 200.

Master-side router 400 is connected to hub 200 and is also connected to terminal-side routers 500-1 to 500-$n$ over the Internet.

Terminal-side routers 500-1 to 500-$n$ are connected to master-side router 400 over the Internet and is also connected to smartphone 600 by radio.

Smartphone 600 is connected to one of terminal-side routers 500-1 to 500-$n$ and periodically transmits the IP address notification, addressed to hub 200, including its own IP address to the one of terminal-side routers 500-1 to 500-$n$ to which smartphone 600 has been connected.

<System Operation>

Figure 2:
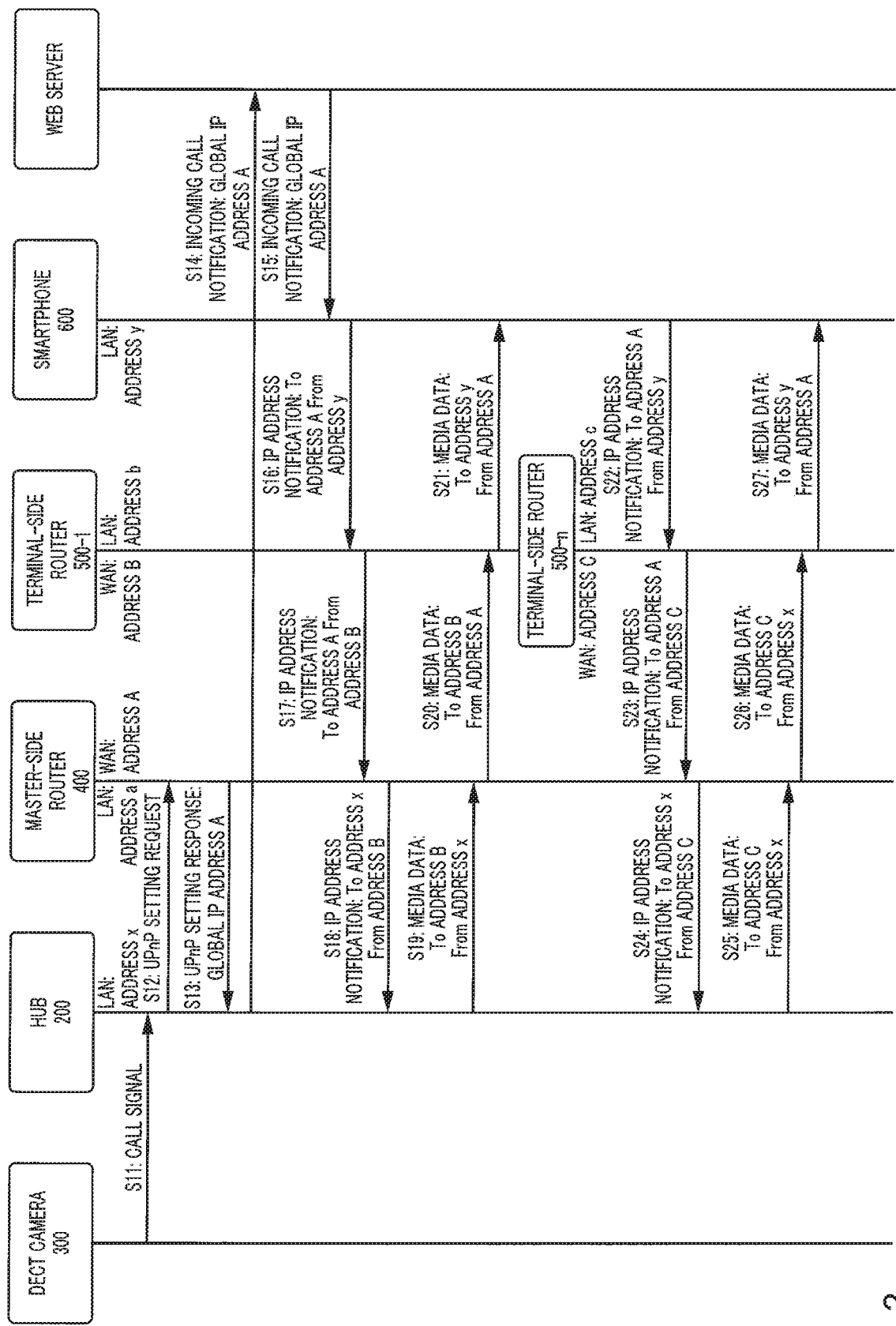
FIG. 2 is a sequence diagram illustrating a communication procedure when a smartphone performs handover.

A description will be given below with reference to FIG. 2 of a communication procedure in a case where smartphone 600 performs handover in camera system 100 described above.

In step S11, when the built-in motion detection sensor detects a moving object, DECT camera 300 transmits the call signal to hub 200.

In step S12, hub 200 transmits a universal plug and play (UPnP) setting request to master-side router 400. In step S13, master-side router 400 notifies hub 200 of its own global IP address (here, address A) with a UPnP setting response.

In step S14, hub 200 transmits, to a web server (not illustrated in FIG. 1), the incoming call notification indicating that a call has arrived from DECT camera 300. The incoming call notification includes a local IP address of hub 200 preliminarily acquired and the global IP address of master-side router 400. In step S15, the web server transmits the incoming call notification to smartphone 600.

In step S16, smartphone 600 transmits the IP address notification for notifying hub 200 of its own IP address to terminal-side router 500-1. In step S17, terminal-side router 500-1 transmits the IP address notification received from smartphone 600 to master-side router 400. In step S18, master-side router 400 transmits the IP address notification received from terminal-side router 500-1 to hub 200.

In step S19, hub 200 transmits the media data such as the audio data and the video data to master-side router 400 along a route where the IP address notification thus received has travelled. In step S20, master-side router 400 transmits the media data received from hub 200 to terminal-side router 500-1. In step S21, terminal-side router 500-1 transmits the media data received from master-side router 400 to smartphone 600.

Here, it is assumed that smartphone 600 performs handover from terminal-side router 500-1 to terminal-side router 500-$n$. This prevents the media data addressed to smartphone 600 from reaching smartphone 600.

In step S22, smartphone 600 transmits, to terminal-side router 500-$n$ to which the handover has been performed, an IP address notification addressed to hub 200. In step S23, terminal-side router 500-$n$ transmits the IP address notification received from smartphone 600 to master-side router 400. In step S24, master-side router 400 transmits the IP address notification received from terminal-side router 500-$n$ to hub 200.

In step S25, hub 200 determines that the IP address notification received from master-side router 400 is different from the IP address notification received in step S18, changes the transmission destination IP address of the media data, and transmits the media data to master-side router 400. In step S26, master-side router 400 transmits the media data received from hub 200 to terminal-side router 500-$n$. In step S27, terminal-side router 500-$n$ transmits the media data received from master-side router 400 to smartphone 600.

As described above, even when smartphone 600 performs handover from terminal-side router 500-1 to terminal-side router 500-$n$, the periodical transmission of the IP address notification to hub 200 allows smartphone 600 to receive the media data from hub 200.

<Hub Configuration>

Figure 3:
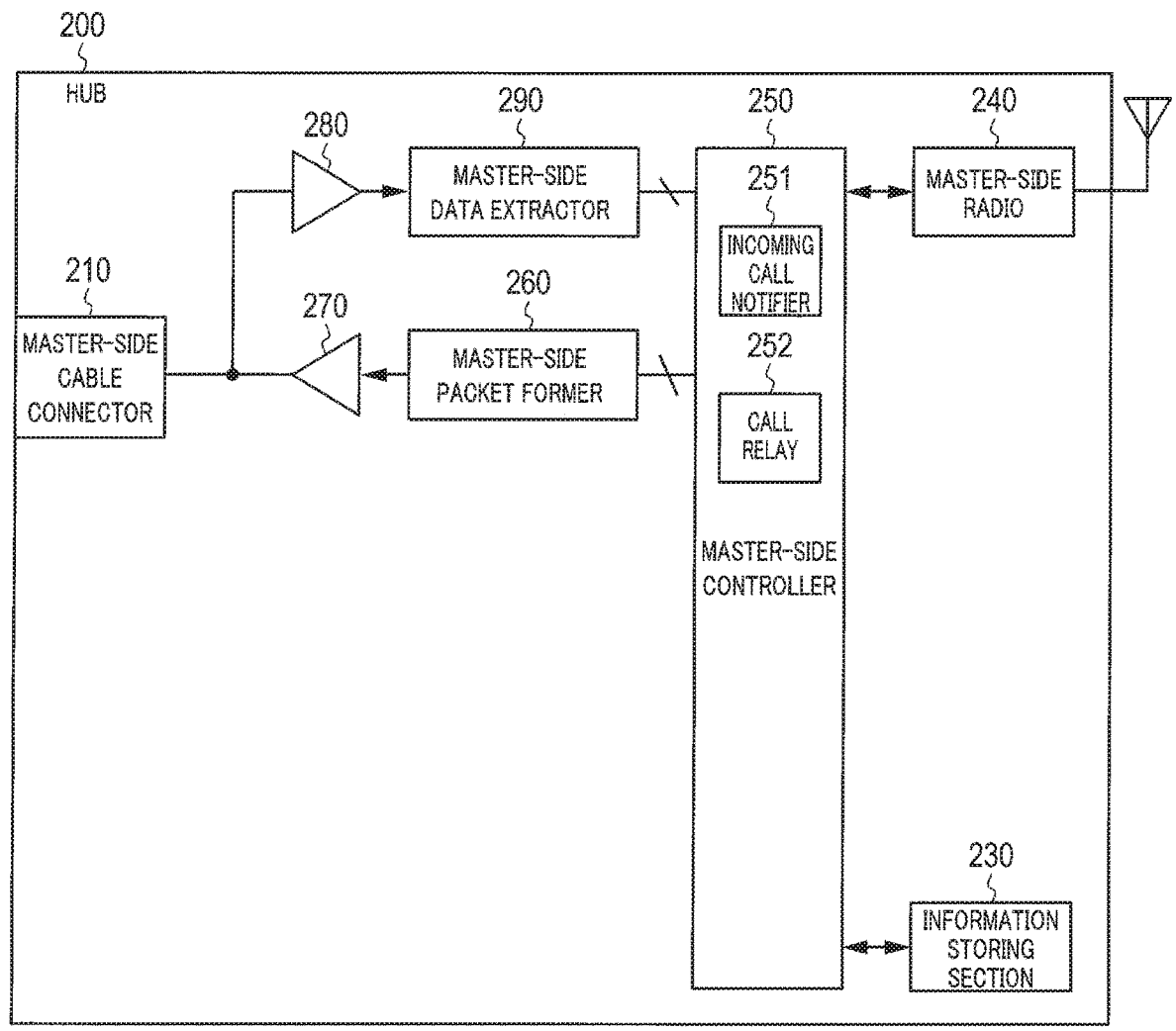
FIG. 3 is a block diagram illustrating an example of a configuration of a hub.

FIG. 3 is a block diagram illustrating an example of a configuration of hub 200.

In FIG. 3, hub 200 includes master-side cable connector 210, information storing section 230, master-side radio 240, master-side controller 250, master-side packet former 260, master-side transmission driver 270, master-side reception driver 280, and master-side data extractor 290.

Master-side cable connector 210 includes, for example, a connection terminal for a two-wire cable, and connects one end of the two-wire cable on an indoor side to master-side transmission driver 270 and master-side reception driver 280 in a signal-transmittable manner.

Information storing section 230 stores login information including, for example, ID information such as a media access control (MAC) address, key information, and a password preliminarily exchanged with smartphone 600 having permission to make a call with DECT camera 300. Information storing section 230 further stores the IP address notification transmitted from smartphone 600.

Master-side radio 240 includes a radio communication circuit and an antenna, and is communicably connected to master-side router 400 over a radio communication line. Then, master-side radio 240 is communicably connected to smartphone 600 via master-side router 400 and one of terminal-side routers 500-1 to 500-$n$.

Master-side controller 250 transmits, to DECT camera 300, control data for operation of hub 200 or operation of DECT camera 300. For example, this control data includes a control signal used for controlling, from hub 200, the operation of DECT camera 300 (operation of data rate, pan, tilt, light, shutter, filter, and the like) and operations of various sensor devices provided in DECT camera 300.

Upon receiving the call signal from DECT camera 300 in incoming call notifier 251, master-side controller 250 acquires the local IP address and the global IP address of smartphone 600 from information storing section 230, and generates the incoming call notification including the local IP address and global IP address thus acquired. Incoming call notifier 251 transmits the incoming call notification to smartphone 600.

Master-side controller 250 receives the IP address notification transmitted from smartphone 600 via master-side radio 240 and compares a transmission source address of the IP address notification previously received and stored in information storing section 230 with a transmission source address of the IP address notification received this time. When the transmission source addresses are different from each other, master-side controller 250 updates the transmission destination IP address of media data including digital audio data and digital video data to the transmission source of the IP address received this time. That is, master-side controller 250 sets the transmission source of the IP address notification received most recently as the transmission destination.

Upon receiving a response instruction from smartphone 600, call relay 252 of master-side controller 250 starts call relay processing for enabling a video call between DECT camera 300 and smartphone 600. This call relay processing is performed by transmitting the digital audio data received from smartphone 600 to DECT camera 300 and transmitting the digital audio data and the digital video data received from DECT camera 300 to smartphone 600.

However, it is preferable that call relay 252 do not transmit the digital audio data received from smartphone 600 to DECT camera 300 until receiving the response instruction from smartphone 600.

Master-side packet former 260 appropriately divides the digital audio data (and control data) output from master-side controller 250 into packets and encodes the packet data thus generated to generate a downlink signal. Master-side packet former 260 outputs the downlink signal thus generated to master-side transmission driver 270.

Master-side transmission driver 270 buffers the downlink signal output from master-side packet former 260, performs gain adjustment on the downlink signal, and transmits the downlink signal to DECT camera 300 via master-side cable connector 210.

Master-side reception driver 280 performs gain adjustment on an uplink signal transmitted from DECT camera 300 via master-side cable connector 210, buffers the uplink signal, and outputs the uplink signal to master-side data extractor 290.

Master-side data extractor 290 extracts the digital audio data and the digital video data of DECT camera 300 from the uplink signal output from master-side reception driver 280 and transmits the digital audio data and the digital video data to master-side controller 250.

Note that master-side controller 250 performs the above-described transmission and reception of various kinds of information to and from DECT camera 300 via master-side packet former 260, master-side transmission driver 270, master-side cable connector 210, master-side reception driver 280, and master-side data extractor 290.

However, master-side controller 250 preliminarily holds transmission control information used for time division duplex between DECT camera 300 and hub 200, the transmission control information defining their respective transmission timings and reception timings. Master-side controller 250 controls, based on the transmission control information, the operation of master-side transmission driver 270 so that the transmission of the downlink signal and the reception of the uplink signal are performed in a time division manner.

Further, master-side controller 250 performs the above-described transmission and reception of various kinds of information to and from smartphone 600 via master-side radio 240.

Such a configuration causes hub 200, when the IP address notification received from smartphone 600 is different from the previous IP address notification, to update the IP address serving as the transmission destination of the digital audio data and the digital video data and then transmit the digital audio data and the digital video data to smartphone 600.

<Smartphone Configuration>

Figure 4:
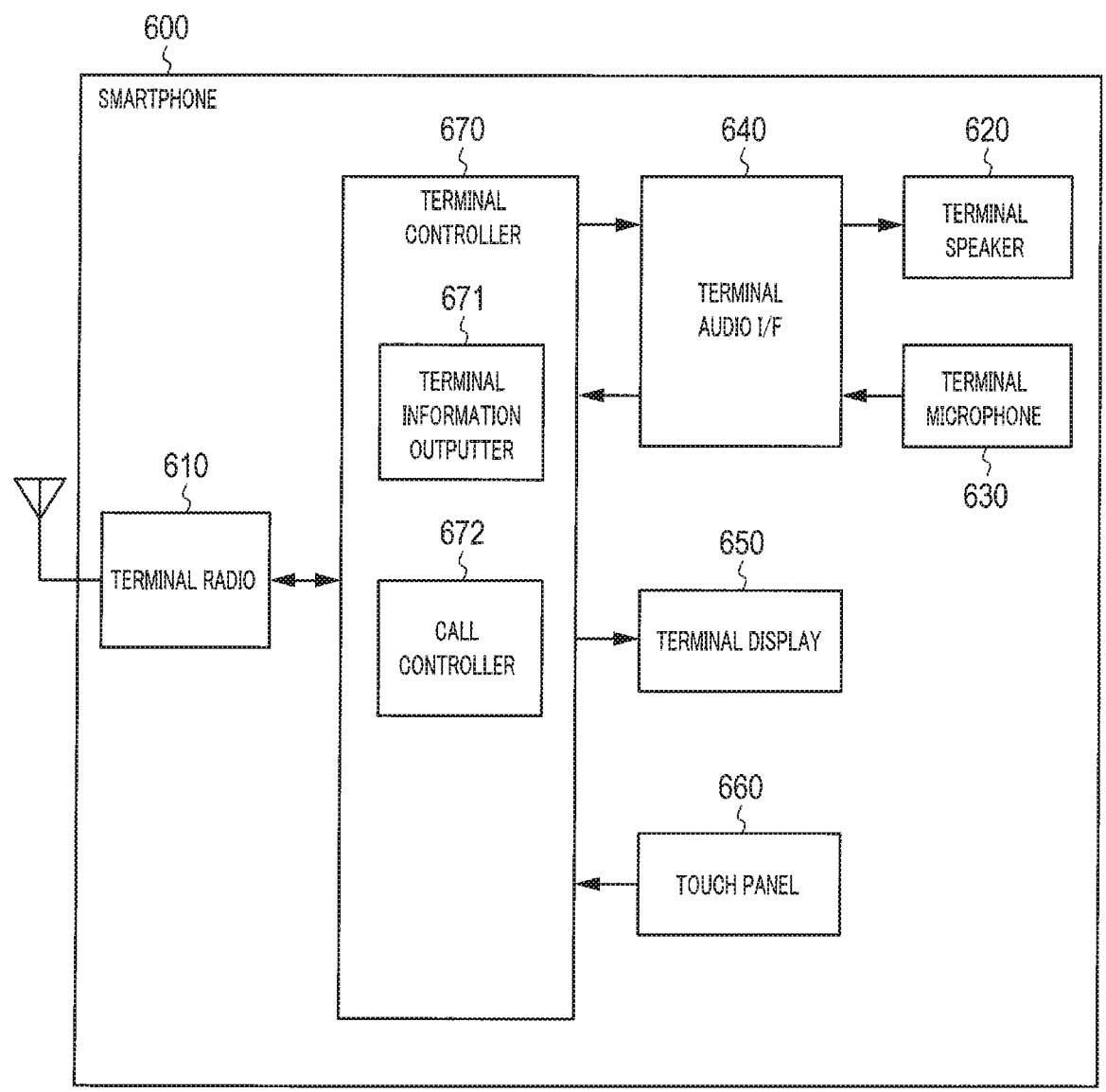
FIG. 4 is a block diagram illustrating an example of a configuration of the smartphone.

FIG. 4 is a block diagram illustrating an example of a configuration of smartphone 600.

In FIG. 4, smartphone 600 includes terminal radio 610, terminal speaker 620, terminal microphone 630, terminal audio I/F 640, terminal display 650, touch panel 660, and terminal controller 670.

Terminal radio 610 includes a radio communication circuit and an antenna and is communicably connected to terminal-side routers 500-1 to 500-$n$ connected to the public network over a radio communication line.

Terminal speaker 620 converts analog audio data output from terminal audio I/F 640 into audio and outputs the audio.

Terminal microphone 630 collects ambient sound, converts the collected sound into analog audio data, and outputs the analog audio data to terminal audio I/F 640.

Terminal audio I/F 640 converts digital audio data output from terminal controller 670 into analog audio data, adjusts a signal level of the analog audio data, and outputs the analog audio data to terminal speaker 620. Further, terminal audio I/F 640 adjusts a signal level of the analog audio data output from terminal microphone 630, converts the analog audio data into digital audio data, and outputs the digital audio data to terminal controller 670. This analog/digital conversion is performed by an A/D, D/A converter (not illustrated).

Note that terminal audio I/F 640 may output, to terminal controller 670, data that results from performing predetermined audio compression processing on data that results from digital-converting the analog audio data output from terminal microphone 630 as digital audio data. Further, when the digital audio data output from terminal controller 670 corresponds to data that results from performing the predetermined audio compression processing, terminal audio I/F 640 may first perform predetermined audio extraction processing on the data and then perform the digital/analog conversion on the data thus extracted.

Terminal display 650 includes a liquid crystal display part of a liquid crystal display with a touch panel and reproduces the digital video data output from terminal controller 670 to display the video. Note that when the digital video data output from terminal controller 670 corresponds to data that results from performing predetermined moving picture compression processing, predetermined moving picture extraction processing is performed on the data, and the video is displayed. Further, terminal display 650 displays a terminal response button and a confirmation button under control of terminal controller 670.

Touch panel 660 receives various operations performed on smartphone 600. For example, when the terminal response button or confirmation button is displayed on terminal display 650, touch panel 660 receives a touch operation performed on the terminal response button or confirmation button. When this operation is performed, touch panel 660 notifies terminal controller 670 of the occurrence of the operation.

Upon receiving the incoming call notification from the web server, terminal information outputter 671 of terminal controller 670 outputs a ringing tone from terminal speaker 620 and causes terminal display 650 to output the digital video data. Note that audio output is performed, for example, by terminal information outputter 671 outputting a digital audio signal of the ringing tone to terminal audio I/F 640. Further, terminal information outputter 671 causes terminal display 650 to display the above-described terminal response button.

Further, call controller 672 of terminal controller 670 receives the incoming call notification, and when a response operation is performed on smartphone 600 by a user, transmits the response instruction to hub 200 to start a call between smartphone 600 and DECT camera 300 via hub 200. The response operation is, for example, a touch operation on the terminal response button displayed on terminal display 650.

Further, terminal controller 670 periodically generates the IP address notification, and transmits the IP address notification thus generated from terminal radio 610 to hub 200.

Note that these functional sections of terminal controller 670 are implemented by, for example, dedicated application software preinstalled in smartphone 600. Further, terminal controller 670 performs the above-described transmission and reception of various kinds of information between the web server and hub 200 via terminal radio 610.

Such a configuration causes smartphone 600 to periodically transmit the IP address notification to hub 200.

<Hub Operation>

Figure 5:
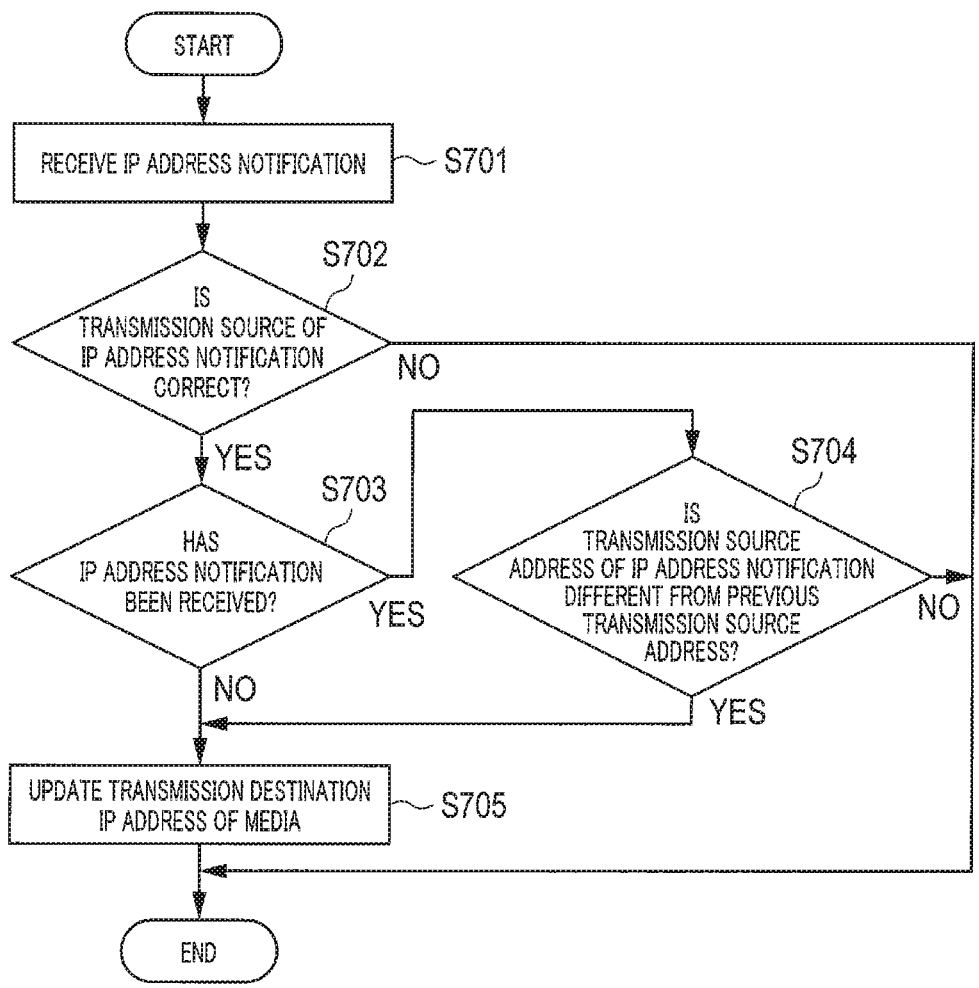
FIG. 5 is a flowchart illustrating a procedure for the hub to update a transmission destination IP address of media data.

FIG. 5 is a flowchart illustrating a procedure for hub 200 to update the transmission destination IP address of media data. In step S701, master-side controller 250 receives the IP address notification transmitted from smartphone 600. In step S702, master-side controller 250 determines whether the transmission source of the IP address notification is a genuine apparatus having valid permission or eligibility. When determining that the transmission source is a genuine apparatus (YES), master-side controller 250 causes the process to proceed to step S703, and when determining that the transmission source is not a genuine apparatus (NO), master-side controller 250 terminates the process.

In step S703, master-side controller 250 searches information storing section 230 to determine whether the IP address notification has been received. When determining that the IP address notification has been received (YES), master-side controller 250 causes the process to proceed to step S704, and when determining that the IP address notification has yet to be received (NO), master-side controller 250 causes the process to proceed to step S705.

In step S704, master-side controller 250 determines whether the transmission source address of the IP address notification received in step S701 is different from the transmission source address of the IP address notification previously received and stored in information storing section 230. When determining that the transmission source addresses are different from each other (YES), master-side controller 250 causes the process to proceed to step S705, and when determining that the transmission source addresses are not different from each other (NO), master-side controller 250 terminates the process.

In step S705, master-side controller 250 updates the transmission destination IP address of media data to the transmission source address of the IP address notification received in step S701 and transmits the media data.

As described above, according to Embodiment 1, smartphone 600 periodically transmits the IP address notification including its own IP address to hub 200 via one of terminal-side routers 500-1 to 500-*n* to which smartphone 600 has been connected, and hub 200 sets the transmission source of the IP address received most recently as the transmission destination of media data, which makes it possible to continue the communication between hub 200 and smartphone 600 even when smartphone 600 performs handover during the communication.

Embodiment 2

Figure 6:
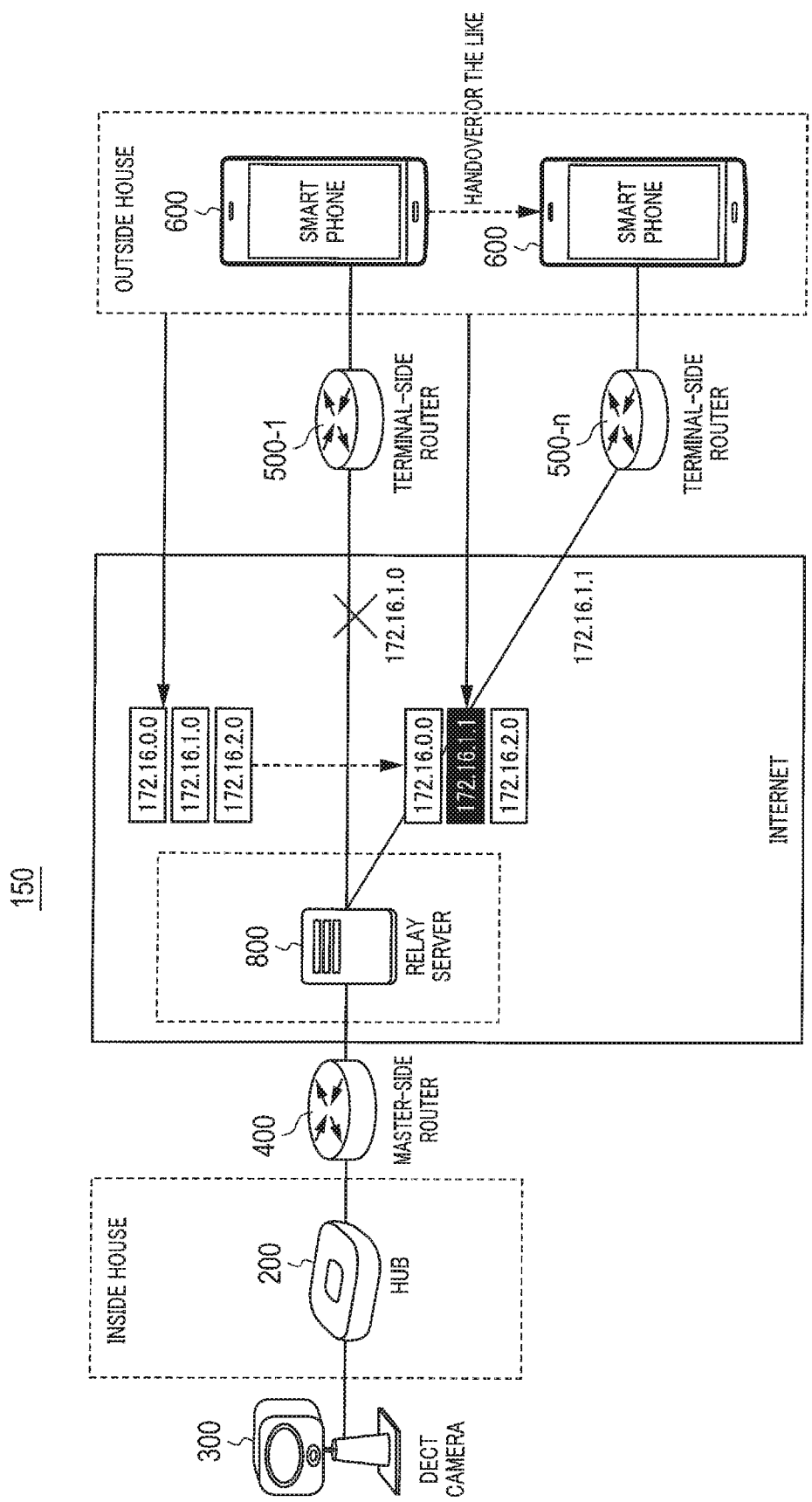
FIG. 6 is a schematic diagram illustrating a configuration of a camera system according to Embodiment 2 of the present disclosure.

FIG. 6 is a schematic diagram illustrating a configuration of a camera system 150 according to Embodiment 2 of the present disclosure. FIG. 6 differs from FIG. 1 in that relay server 800 is additionally provided.

Relay server 800 is a server that is provided on the Internet and is interposed between master-side router 400 and terminal-side routers 500-1 to 500-*n* to establish connection between master-side router 400 and terminal-side routers 500-1 to 500-*n*. Further, relay server 800 manages an IP address notification transmitted from smartphone 600, and, with a transmission source of the IP address notification, that is, a route along which the IP address notification has travelled, transmits media data including audio data and video data received from hub 200.

The installation of relay server 800 eliminates the need for the above-described function of hub 200 described in Embodiment 1 from hub 200 according to Embodiment 2 of the present disclosure.

Figure 7:
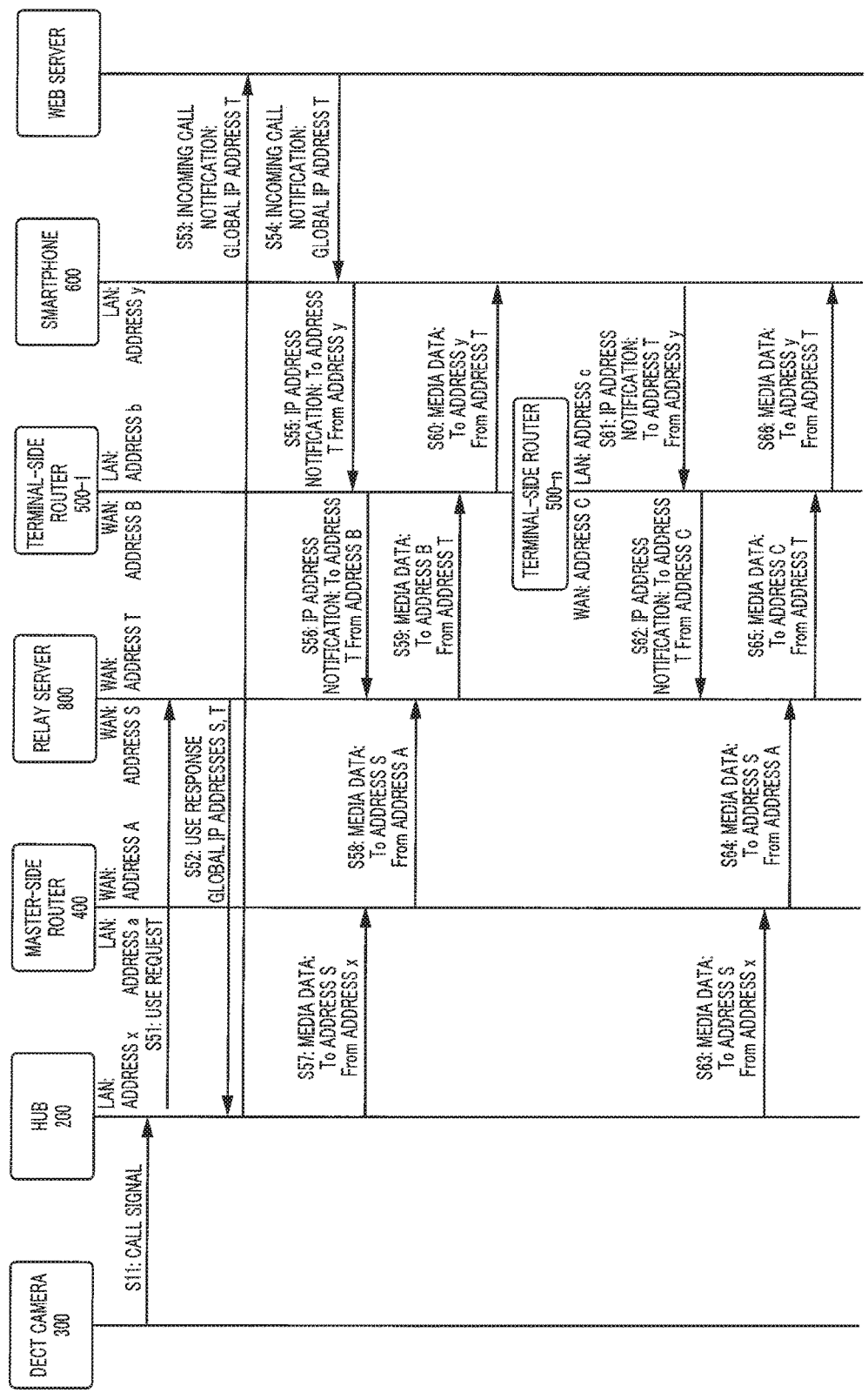
FIG. 7 is a sequence diagram illustrating a communication procedure when a smartphone performs handover.

A description will be given below with reference to FIG. 7 of a communication procedure in a case where smartphone 600 performs handover in camera system 150 described above.

In step S11, when a built-in motion detection sensor detects a moving object, DECT camera 300 transmits a call signal to hub 200.

In step S51, hub 200 transmits a use request to relay server 800. In step S52, relay server 800 notifies hub 200 of its own global IP addresses (here, address S, address T) with a use response.

In step S53, hub 200 transmits, to a web server (not illustrated in FIG. 6), an incoming call notification indicating that a call has arrived from DECT camera 300. The incoming call notification includes a local IP address of hub 200 preliminarily acquired and the global IP address of relay server 800. In step S54, the web server transmits the incoming call notification to smartphone 600.

In step S55, smartphone 600 transmits the IP address notification for notifying relay server 800 of its own IP address to terminal-side router 500-1. In step S56, terminal-side router 500-1 transmits the IP address notification received from smartphone 600 to relay server 800.

In step S57, hub 200 transmits media data such as audio data and video data to master-side router 400. In step S58, master-side router 400 transmits the media data received from hub 200 to relay server 800.

In step S59, relay server 800 transmits, to terminal-side router 500-1, the media data that has been received from master-side router 400 and is addressed to the transmission source of the IP address notification. In step S60, terminal-side router 500-1 transmits the media data received from relay server 800 to smartphone 600.

Here, it is assumed that smartphone 600 performs handover from terminal-side router 500-1 to terminal-side router 500-*n*. This prevents the media data addressed to smartphone 600 from reaching smartphone 600.

In step S61, smartphone 600 transmits, to terminal-side router 500-*n* to which the handover has been performed, an IP address notification addressed to hub 200. In step S62, terminal-side router 500-*n* transmits the IP address notification received from smartphone 600 to relay server 800. At this time, relay server 800 determines that the IP address notification received from terminal-side router 500-*n* is different from the IP address notification received in step S56, and changes the transmission destination IP address of the media data.

In step S63, hub 200 transmits the media data to master-side router 400. In step S64, master-side router 400 transmits the media data received from hub 200 to relay server 800.

In step S65, relay server 800 transmits the media data received from master-side router 400 to terminal-side router 500-*n*. In step S66, terminal-side router 500-*n* transmits the media data received from relay server 800 to smartphone 600.

As described above, even when smartphone 600 performs handover from terminal-side router 500-1 to terminal-side router 500-*n*, the periodical transmission of the IP address notification to relay server 800 allows smartphone 600 to receive the media data from hub 200 via relay server 800.

Figure 8:
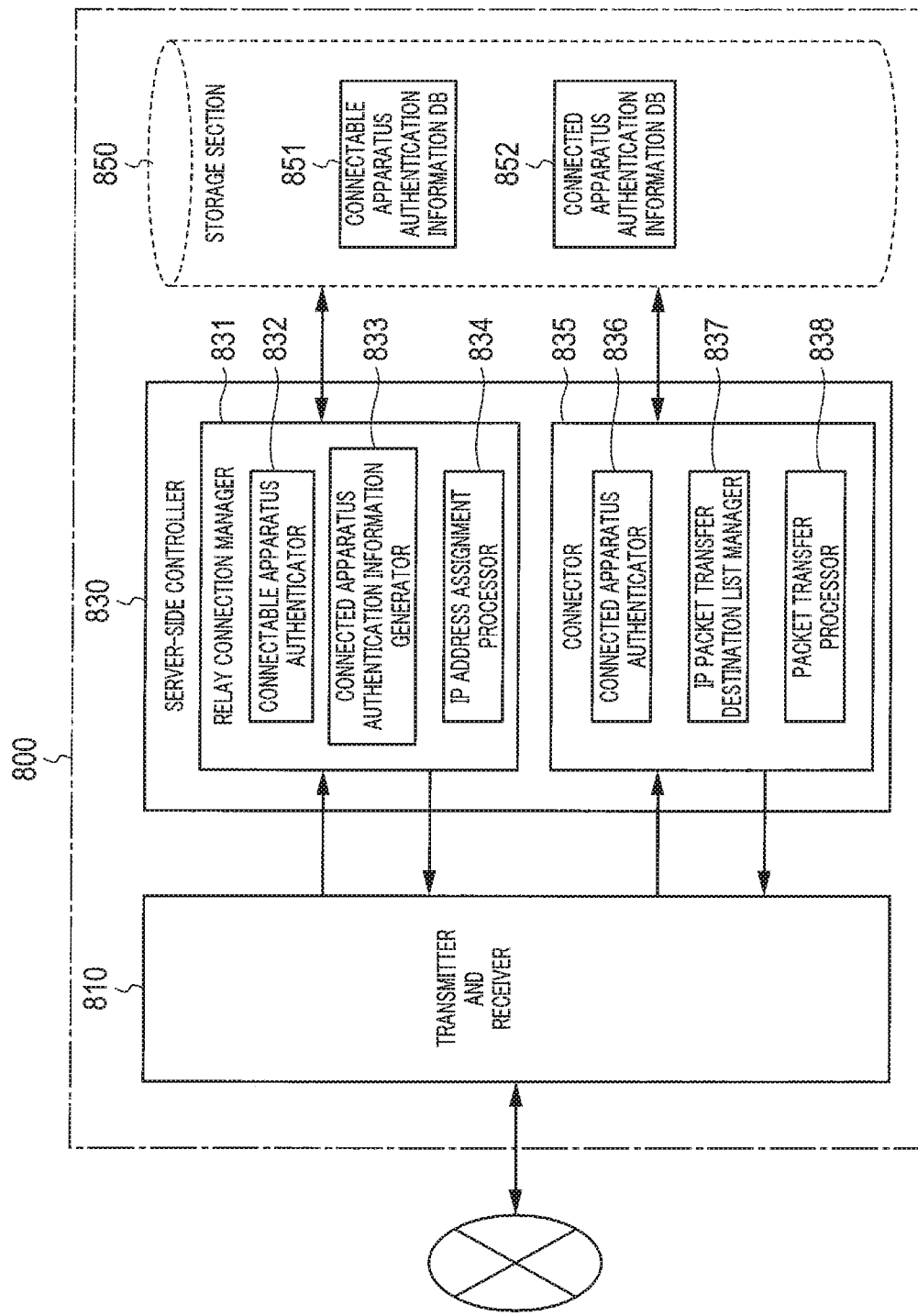
FIG. 8 is a block diagram illustrating an example of a configuration of a relay server.

FIG. 8 is a block diagram illustrating an example of a configuration of relay server 800.

In FIG. 8, relay server 800 includes transmitter and receiver 810, server-side controller 830, and storage section 850.

Transmitter and receiver 810 is communicably connected to master-side router 400 and terminal-side routers 500-1 to 500-*n* over the Internet.

Server-side controller 830 includes relay connection manager 831 and connector 835, and comprehensively controls relay server 800.

Relay connection manager 831 includes connectable apparatus authenticator 832, connected apparatus authentication information generator 833, and IP address assignment processor 834. Upon receiving the use request from hub 200, relay connection manager 831 assigns a global IP address to each of master-side router 400 and terminal-side routers 500-1 to 500-*n*.

In response to the use request from hub 200, connectable apparatus authenticator 832 performs authentication on hub 200 that has transmitted the use request to determine whether hub 200 is a genuine apparatus having use permission or eligibility based on connectable apparatus authentication information database (DB) 851 stored in storage section 850. Connectable apparatus authenticator 832 outputs a result of the authentication to connected apparatus authentication information generator 833.

Upon acquiring a result indicating success in the authentication from connectable apparatus authenticator 832, connected apparatus authentication information generator 833 generates authentication information (connected apparatus authentication information) for a relay connection session to be established with hub 200 that has transmitted the use request. This authentication information is notified to smartphone 600 from hub 200 that has transmitted the use request and then used. Note that hub 200 also generates connected apparatus authentication information.

IP address assignment processor 834 assigns a global IP address that is a server resource to each of master-side router 400 and terminal-side routers 500-1 to 500-*n*.

Connector 835 includes connected apparatus authenticator 836, IP packet transfer destination list manager 837, and packet transfer processor 838. Connector 835 transfer an IP packet that is addressed to the global IP address assigned by relay connection manager 831 and has arrived at master-side router 400 to one of terminal-side routers 500-1 to 500-*n*, and transfers an IP packet that is addressed to the global IP address assigned by relay connection manager 831 and has arrived at one of terminal-side routers 500-1 to 500-*n* to master-side router 400. This enables an IP packet relay function over the network.

Connected apparatus authenticator 836 performs authentication on the IP packet that is addressed to the global IP address assigned by relay connection manager 831 using the authentication information generated by connected apparatus authentication information generator 833.

IP packet transfer destination list manager 837 manages a list in which the transmission source address of the IP packet that arrives at the global IP address of one of terminal-side routers 500-1 to 500-*n* from smartphone 600 is associated with the transfer destination of the IP packet that arrives at the global IP address of master-side router 400 from hub 200.

Packet transfer processor 838 transfers the packet received from hub 200 to smartphone 600 and transfers the packet received from smartphone 600 to hub 200 based on the list managed by IP packet transfer destination list manager 837.

Storage section 850 has connectable apparatus authentication information database 851 and connected apparatus authentication information database 852. Appropriate authentication information is registered in these databases by relay connection manager 831, and authentication information is retrieved from these databases as necessary.

Figure 9:
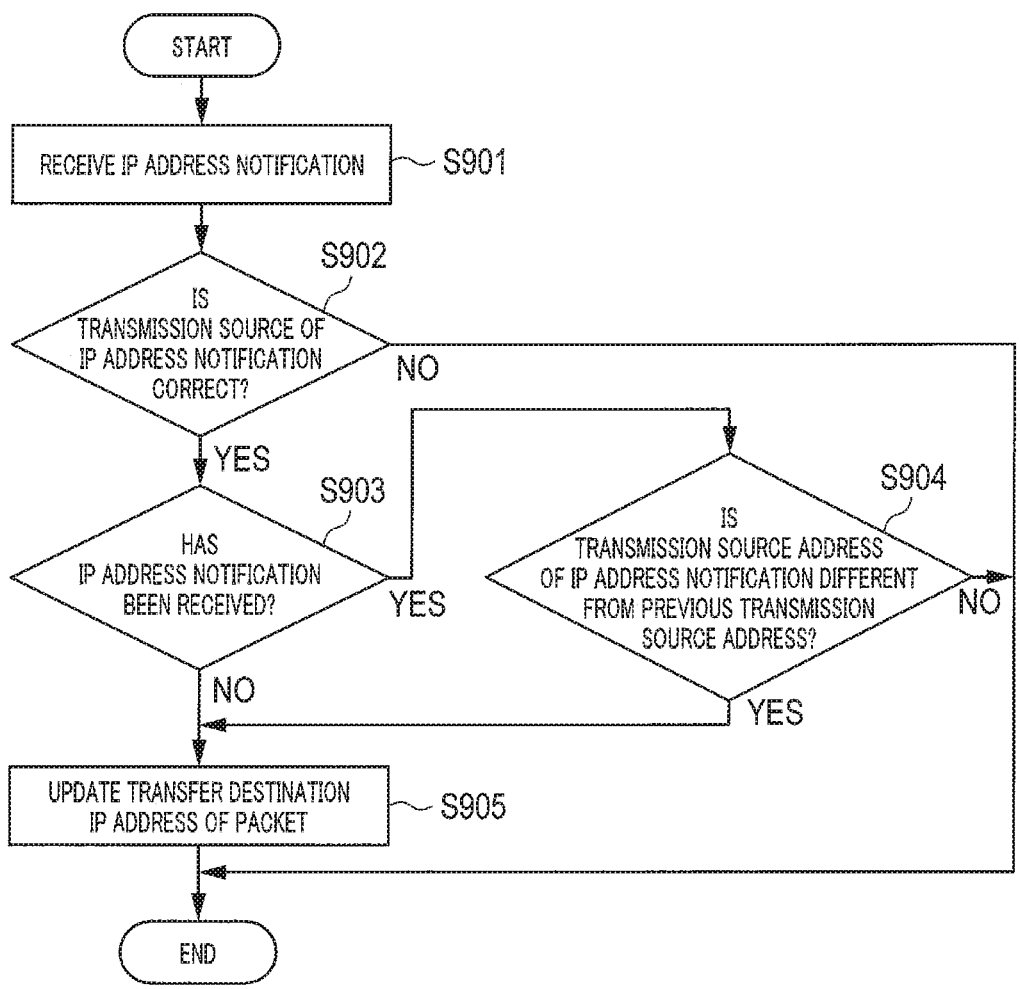
FIG. 9 is a flowchart illustrating a procedure for the relay server to update a transmission destination IP address of media data.

FIG. 9 is a flowchart illustrating a procedure for relay server 800 to update the transmission destination IP address of media data. In step S901, server-side controller 830 receives the IP address notification transmitted from smartphone 600. In step S902, server-side controller 830 determines whether the transmission source of the IP address notification is a genuine apparatus having valid permission or eligibility. When determining that the transmission source is a genuine apparatus (YES), server-side controller 830 causes the process to proceed to step S903, and when determining that the transmission source is not a genuine apparatus (NO), server-side controller 830 terminates the process.

In step S903, server-side controller 830 searches IP packet transfer destination list manager 837 to determine whether the IP address notification has been received. When determining that the IP address notification has been received (YES), server-side controller 830 causes the process to proceed to step S904, and when determining that the IP address notification has yet to be received (NO), server-side controller 830 causes the process to proceed to step S905.

In step S904, server-side controller 830 determines whether the transmission source address of the IP address notification received in step S901 is different from the transmission source address of the IP address notification previously received and stored in IP packet transfer destination list manager 837. When determining that the transmission source addresses are different from each other (YES), server-side controller 830 causes the process to proceed to step S905, and when determining that the transmission source addresses are not different from each other (NO), server-side controller 830 terminates the process.

In step S905, server-side controller 830 updates the transmission destination IP address of media data to the transmission source address of the IP address notification received in step S901 and transmits the media data.

As described above, according to Embodiment 2, smartphone 600 periodically transmits the IP address notification including its own IP address to relay server 800 via one of terminal-side routers 500-1 to 500-*n* to which smartphone 600 has been connected, and relay server 800 sets the transmission source of the IP address received most recently as the transfer destination of media data from hub 200, which makes it possible to continue the communication between hub 200 and smartphone 600 even when smartphone 600 performs handover during the communication.

Embodiment 3

<System Overview>

Figure 10:
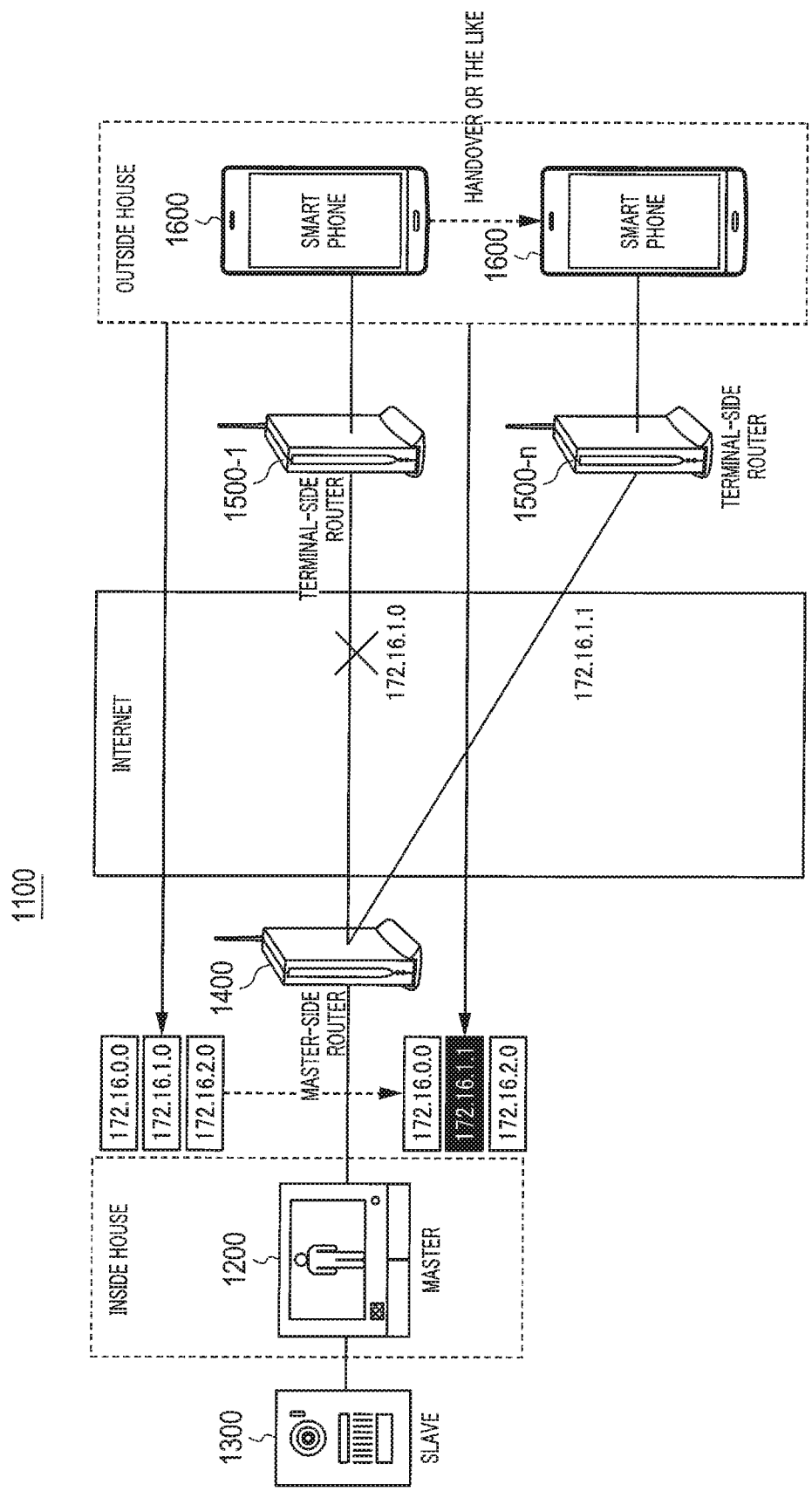
FIG. 10 is a schematic diagram illustrating a configuration of a door phone system according to Embodiment 3 of the present disclosure.

FIG. 10 is a schematic diagram illustrating a configuration of door phone system 1100 according to Embodiment 3 of the present disclosure. As illustrated in FIG. 10, door phone system 1100 includes door phone master (hereinafter, simply referred to as "master") 1200, entrance slave (hereinafter, simply referred to as "slave") 1300, master-side router 1400, terminal-side routers 1500-1 to 1500-n (n is 1 or more), and smartphone 1600 as a mobile terminal apparatus. Note that master-side router 1400 and terminal-side routers 1500-1 to 1500-n are connected over a public network (here, the Internet).

Master 1200 is, for example, installed indoor such as in a house, and is fixed to a wall or placed on a table or a stand. Master 1200 is connected to slave 1300 by wire or radio, transmits and receives audio data and control data to and from slave 1300, and receives video data from slave 1300. Further, master 1200 is connected to master-side router 1400 by wire or radio and is connected to terminal-side router 1500 via master-side router 1400 and over the Internet. Slave 1300 receives a call operation, and master 1200 receives a call signal from slave 1300. When no one is in the house, master 1200 transmits an incoming call notification to master-side router 1400. Master 1200 manages an IP address notification transmitted from smartphone 1600 and transmits media data including the audio data, the video data, and the like to a transmission source of the IP address notification. Note that, in the present embodiment, it is assumed that master 1200 is connected to slave 1300 by wire and is connected to master-side router 1400 by radio.

Slave 1300 is installed, for example, at an entrance of a house or the like. Slave 1300 is connected to master 1200 by wire and transmits and receives the audio data and the control data to and from master 1200. Note that, in the present embodiment, slave 1300 is connected to master 1200 by wire, but may be connected to master 1200 by radio. Upon receiving the call operation, slave 1300 transmits the call signal to master 1200. Further, slave 1300 includes a camera, and when slave 1300 receives the call operation, the camera takes images of the entrance and transmits video data to master 1200.

Master-side router 1400 is connected to master 1200 by radio and is also connected to terminal-side routers 1500-1 to 1500-n over the Internet.

Terminal-side routers 1500-1 to 1500-n are connected to master-side router 1400 over the Internet and are also connected to smartphone 1600 by radio.

Smartphone 1600 is connected to one of terminal-side routers 1500-1 to 1500-n and periodically transmits the IP address notification, addressed to master 1200, including its own IP address to the one of terminal-side routers 1500-1 to 1500-n to which smartphone 1600 has been connected.

<System Operation>

Figure 11:
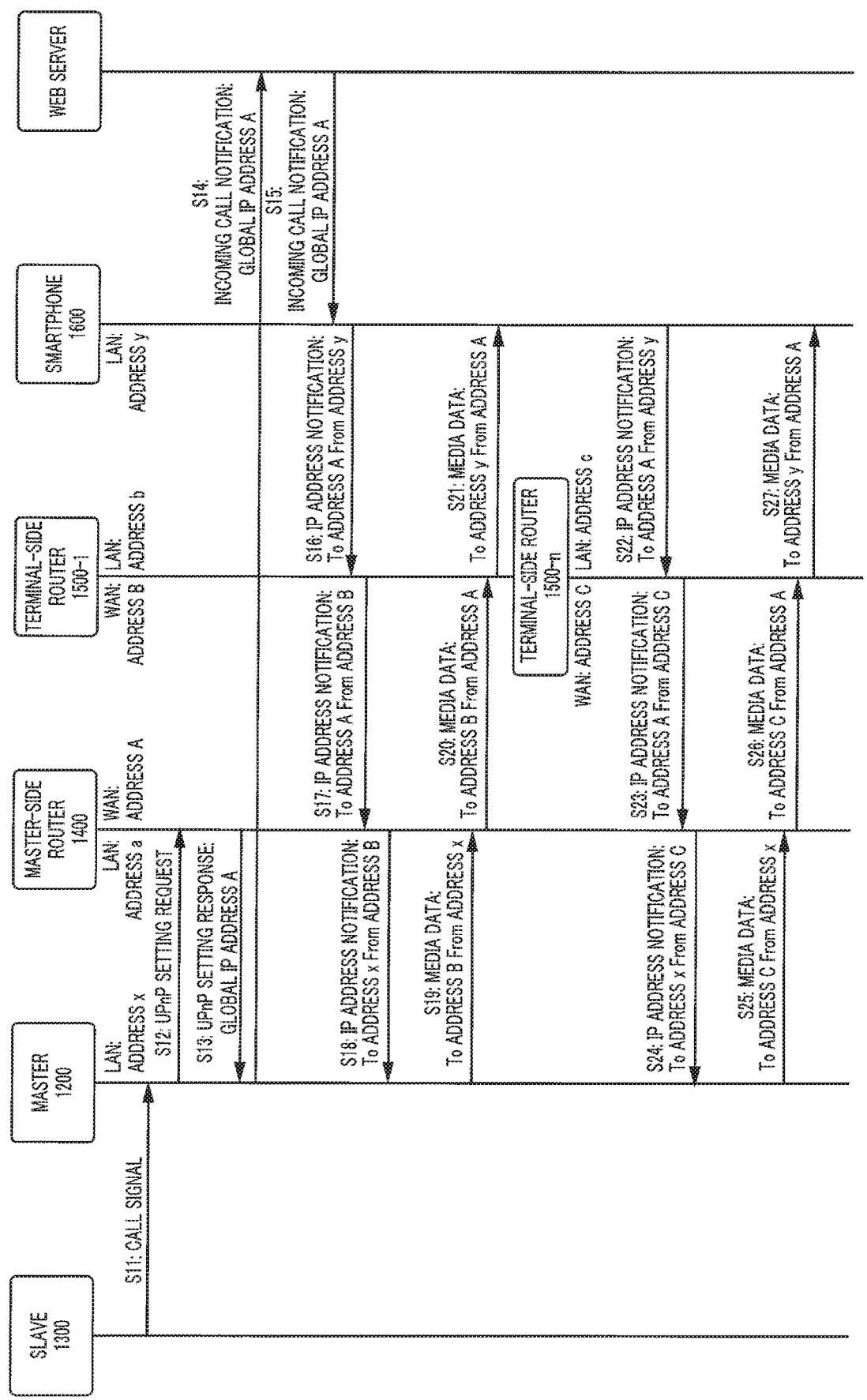
FIG. 11 is a sequence diagram illustrating a communication procedure when a smartphone performs handover.

A description will be given below with reference to FIG. 11 of a communication procedure when smartphone 1600 performs handover in door phone system 1100 described above.

In step S11, slave 1300 receives the call operation from a visitor and transmits the call signal to master 1200.

In step S12, master 1200 transmits a universal plug and play (UPnP) setting request to master-side router 1400. In step S13, master-side router 1400 notifies master 1200 of its own global IP address (here, address A) with a UPnP setting response.

In step S14, master 1200 transmits, to a web server (not illustrated in FIG. 10), the incoming call notification indicating that a call has arrived from slave 1300. The incoming call notification includes a local IP address of master 1200 preliminarily acquired and a global IP address of master-side router 1400. In step S15, the web server transmits the incoming call notification to smartphone 1600.

In step S16, smartphone 1600 transmits the IP address notification for notifying master 1200 of its own IP address to terminal-side router 1500-1. In step S17, terminal-side router 1500-1 transmits the IP address notification received from smartphone 1600 to master-side router 1400. In step S18, master-side router 1400 transmits the IP address notification received from terminal-side router 1500-1 to master 1200.

In step S19, master 1200 transmits the media data such as the audio data and the video data to master-side router 1400 along a route where the IP address notification thus received has travelled. In step S20, master-side router 1400 transmits the media data received from master 1200 to terminal-side router 1500-1. In step S21, terminal-side router 1500-1 transmits the media data received from master-side router 1400 to smartphone 1600.

Here, it is assumed that smartphone 1600 performs handover from terminal-side router 1500-1 to terminal-side router 1500-n. This prevents the media data addressed to smartphone 1600 from reaching smartphone 1600.

In step S22, smartphone 1600 transmits, to terminal-side router 1500-n to which the handover has been performed, an IP address notification addressed to master 1200. In step S23, terminal-side router 1500-n transmits the IP address notification received from smartphone 1600 to master-side router 1400. In step S24, master-side router 1400 transmits the IP address notification received from terminal-side router 1500-n to master 1200.

In step S25, master 1200 determines that the IP address notification received from master-side router 1400 is different from the IP address notification received in step S18, changes the transmission destination IP address of the media data, and transmits the media data to master-side router 1400. In step S26, master-side router 1400 transmits the media data received from master 1200 to terminal-side router 1500-n. In step S27, terminal-side router 1500-n transmits the media data received from master-side router 1400 to smartphone 1600.

As described above, even when smartphone 1600 performs handover from terminal-side router 1500-1 to terminal-side router 1500-n, the periodical transmission of the IP address notification to master 1200 allows smartphone 1600 to receive the media data from master 1200.

<Master Configuration>

Figure 12:
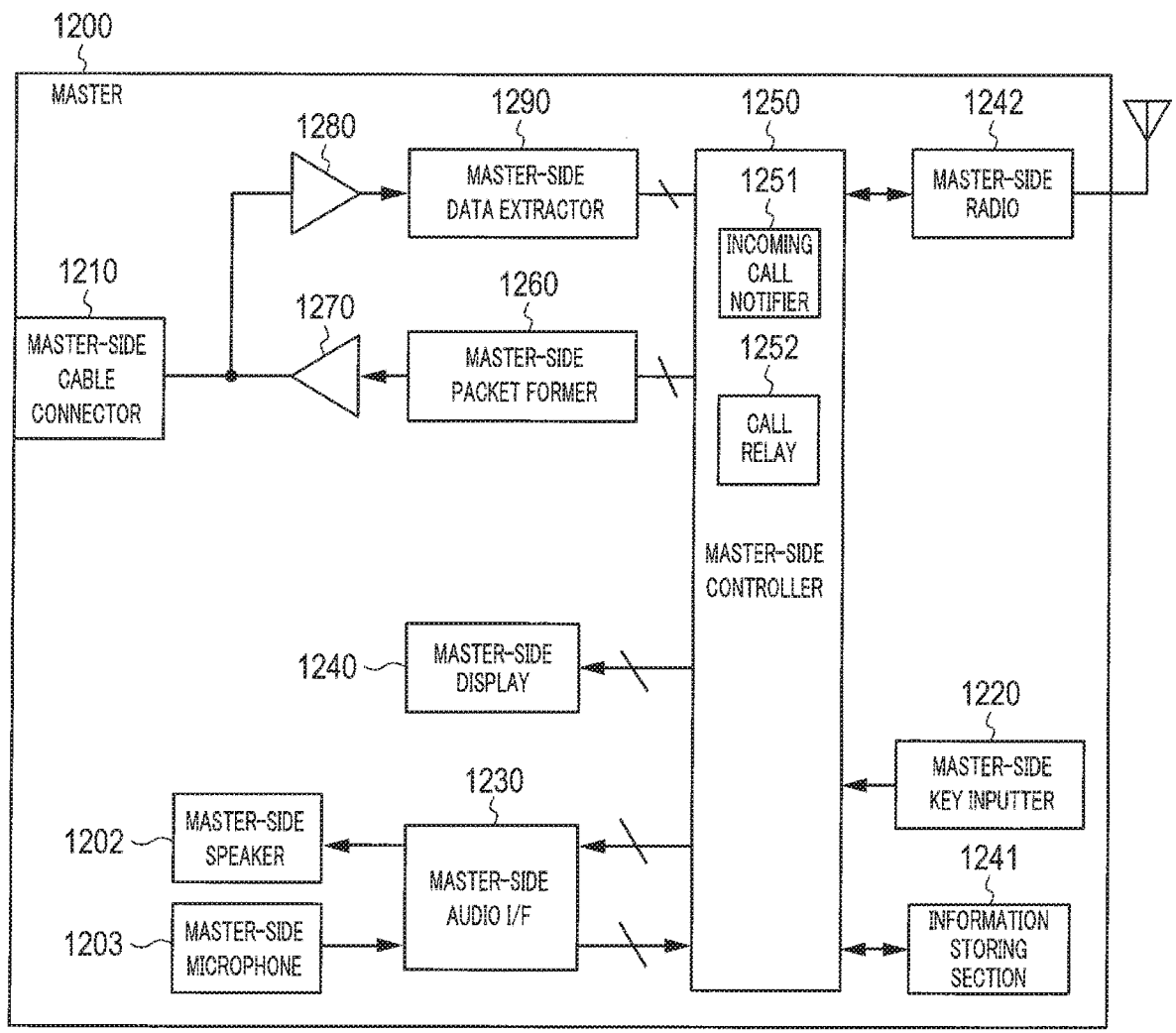
FIG. 12 is a block diagram illustrating an example of a configuration of a master.

FIG. 12 is a block diagram illustrating an example of a configuration of master 1200.

In FIG. 12, master 1200 includes master-side cable connector 1210, master-side key inputter 1220, master-side speaker 1202, master-side microphone 1203, master-side audio I/F 1230, and master-side display 1240. Master 1200 further includes information storing section 1241, master-side radio 1242, master-side controller 1250, master-side packet former 1260, master-side transmission driver 1270, master-side reception driver 1280, and master-side data extractor 1290.

Master-side cable connector 1210 includes, for example, a connection terminal for a two-wire cable, and connects one end of the two-wire cable on an indoor side to master-side transmission driver 1270 and master-side reception driver 1280 in a signal-transmittable manner.

Master-side key inputter 1220 includes a response button, and when the response button is operated, master-side key inputter 1220 outputs a signal indicating the occurrence of the operation to master-side controller 1250.

Master-side speaker 1202 converts analog audio data output from master-side audio I/F 1230 into audio and outputs the audio.

Master-side microphone 1203 collects ambient sound, converts the collected sound into analog audio data, and outputs the analog audio data to master-side audio I/F 1230.

Master-side audio I/F 1230 converts digital audio data output from master-side controller 1250 into analog audio data, adjusts a signal level of the analog audio data, and outputs the analog audio data to master-side speaker 1202. Further, master-side audio I/F 1230 adjusts a signal level of the analog audio data output from master-side microphone 1203, converts the analog audio data into digital audio data, and outputs the digital audio data to master-side controller 1250. This analog/digital conversion is performed by an A/D, D/A converter (not illustrated).

Note that master-side audio I/F 1230 may output, to master-side controller 1250, data that results from performing predetermined audio compression processing on data that results from digital-converting the analog audio data output from master-side microphone 1203 as digital audio data. Further, when the digital audio data output from master-side controller 1250 corresponds to data that results from performing the predetermined audio compression processing, master-side audio I/F 1230 may first perform predetermined audio extraction processing on the data and then perform the digital/analog conversion on the data thus extracted.

Master-side display 1240 includes a liquid crystal display and reproduces the digital video data output from master-side controller 1250 to display the video capturing the entrance. Note that when the digital video data output from master-side controller 1250 corresponds to data that results from performing predetermined moving picture compression processing, predetermined moving picture extraction processing is performed on the data, and the video is displayed.

Information storing section 1241 stores login information including, for example, ID information such as a media access control (MAC) address, key information, and a password preliminarily exchanged with smartphone 1600 having permission to make a call with slave 1300. Further, information storing section 1241 stores the IP address notification transmitted from smartphone 1600.

Master-side radio 1242 includes a radio communication circuit and an antenna, and is communicably connected to master-side router 1400 over a radio communication line. Then, master-side radio 1242 is communicably connected to smartphone 1600 via master-side router 1400 and terminal-side routers 1500-1 to 1500-*n*.

Upon receiving the call signal from slave 1300, master-side controller 1250 outputs a predetermined ringing tone from master-side speaker 1202. The output of the ringing tone is performed, for example, by master-side controller 1250 outputting a digital audio signal of the predetermined ringing tone to master-side audio I/F 1230.

Further, master-side controller 1250 starts predetermined control processing to enable a video call. This control processing is performed by transmitting the digital audio data output from master-side audio I/F 1230 to slave 1300. Further, this control processing is performed by outputting the digital audio data and the digital video data received from slave 1300 to master-side audio I/F 1230 and master-side display 1240.

However, it is preferable that master-side controller 1250 do not transmit the digital audio data to slave 1300 until a signal indicating the occurrence of the operation on the response button is output from master-side key inputter 1220.

Note that, upon receiving the call signal or transmitting the incoming call notification, master-side controller 1250 may perform control to activate master-side speaker 1202, master-side microphone 1203, master-side audio IF 1230, and master-side display 1240.

Further, master-side controller 1250 may transmit, to slave 1300, control data for operation of master 1200 or operation of slave 1300. For example, this control data includes a control signal used for controlling, from master 1200, the operation of the camera (data rate, pan, tilt, light, shutter, filter, and the like) of slave 1300 and operations of various sensor devices provided in slave 1300.

Upon receiving the call signal from slave 1300 in incoming call notifier 1251, master-side controller 1250 acquires the local IP address and the global IP address of smartphone 1600 from information storing section 1241, and generates the incoming call notification including the local IP address and global IP address thus acquired. Incoming call notifier 1251 transmits the incoming call notification to smartphone 1600.

Master-side controller 1250 receives the IP address notification transmitted from smartphone 1600 via master-side radio 1242 and compares the transmission source address of the IP address notification previous received and stored in information storing section 1241 with the transmission source address of the IP address notification received this time. When the source addresses are different from each other, master-side controller 1250 updates the transmission destination IP address of media data including digital audio data and digital video data to the transmission source of the IP address received this time. That is, master-side controller 1250 sets the transmission source of the IP address notification received most recently as the transmission destination.

Upon receiving a response instruction from smartphone 1600, call relay 1252 of master-side controller 1250 starts call relay processing for enabling a video call between slave 1300 and smartphone 1600. This call relay processing is performed by transmitting the digital audio data received from smartphone 1600 to slave 1300 and transmitting the digital audio data and the digital video data received from slave 1300 to smartphone 1600.

However, it is preferable that call relay 1252 do not transmit the digital audio data received from smartphone 1600 to slave 1300 until receiving the response instruction from smartphone 1600.

Master-side packet former 1260 appropriately divides the digital audio data (and control data) output from master-side controller 1250 into packets and encodes the packet data thus generated to generate a downlink signal. Master-side packet former 1260 outputs the downlink signal thus generated to master-side transmission driver 1270.

Master-side transmission driver 1270 buffers the downlink signal output from master-side packet former 1260, performs gain adjustment on the downlink signal, and transmits the downlink signal to slave 1300 via master-side cable connector 1210.

Master-side reception driver 1280 performs gain adjustment on an uplink signal transmitted from slave 1300 via master-side cable connector 1210, buffers the uplink signal, and outputs the uplink signal to master-side data extractor 1290.

Master-side data extractor 1290 extracts the digital audio data and the digital video data of slave 1300 from the uplink signal output from master-side reception driver 1280 and transmits the digital audio data and the digital video data to master-side controller 1250.

Note that master-side controller 1250 performs the above-described transmission and reception of various kinds of information to and from slave 1300 via master-side packet former 1260, master-side transmission driver 1270, master-side cable connector 1210, master-side reception driver 1280, and master-side data extractor 1290.

However, master-side controller 1250 preliminarily holds transmission control information used for time division duplex between slave 1300 and master 1200, the transmission control information defining their respective transmission timings and reception timings. Master-side controller 1250 controls, based on the transmission control information, the operation of master-side transmission driver 1270 so that the transmission of the downlink signal and the reception of the uplink signal are performed in a time division manner.

Further, master-side controller 1250 performs the above-described transmission and reception of various kinds of information to and from smartphone 1600 via master-side radio 1242.

Further, data exchanges between the above-described components of master 1200 are performed by digital transmission except between master-side speaker 1202 and master-side microphone 1203, and master-side audio I/F 1230.

Such a configuration causes master 1200, when the IP address notification received from smartphone 1600 is different from the previous IP address notification, to update the IP address serving as the transmission destination of the digital audio data and the digital video data and then transmit the digital audio data and the digital video data to smartphone 1600.

<Smartphone Configuration>

Figure 13:
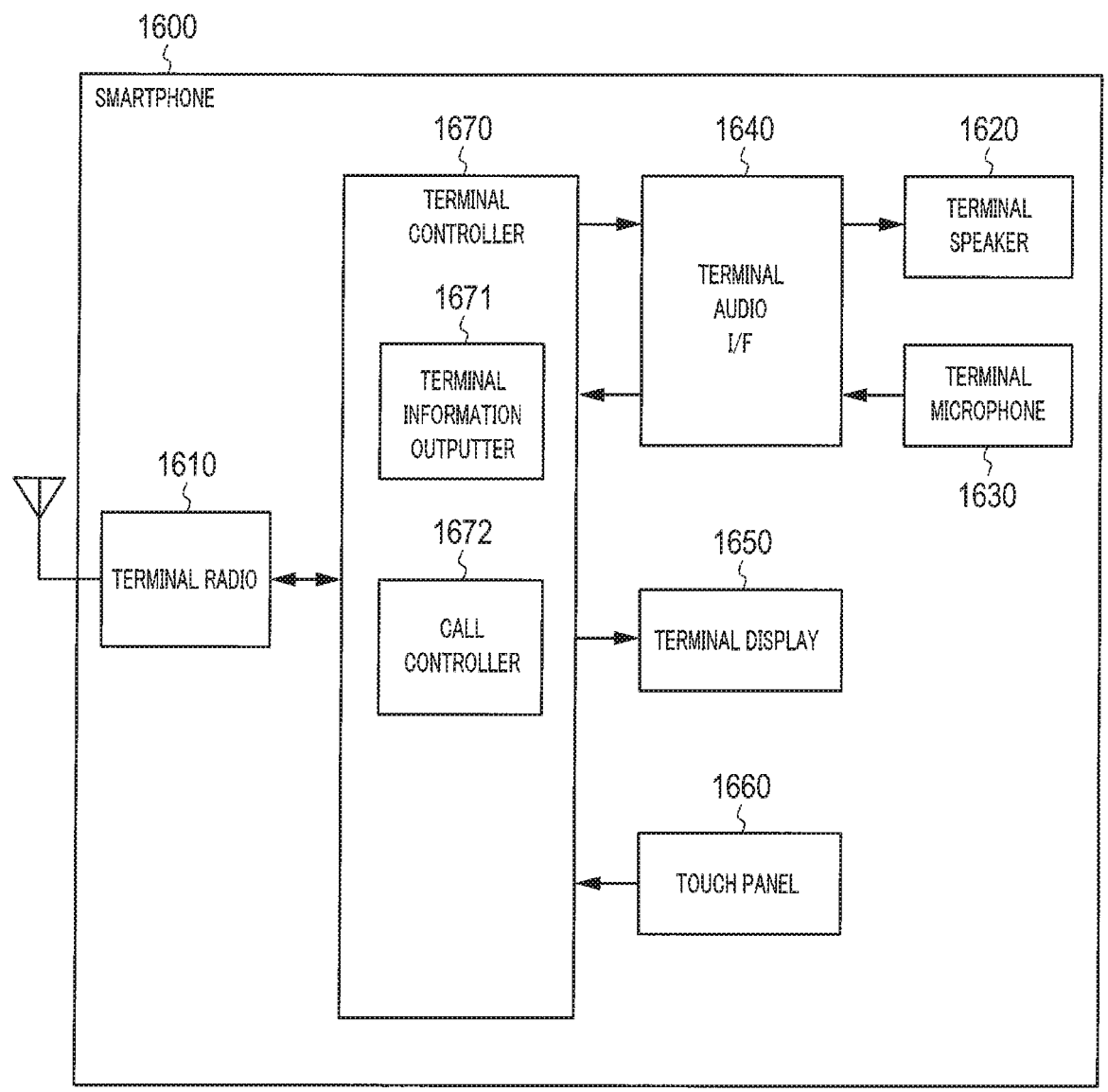
FIG. 13 is a block diagram illustrating an example of a configuration of a smartphone.

FIG. 13 is a block diagram illustrating an example of a configuration of smartphone 1600.

In FIG. 13, smartphone 1600 includes terminal radio 1610, terminal speaker 1620, terminal microphone 1630, terminal audio I/F 1640, terminal display 1650, touch panel 1660, and terminal controller 1670.

Terminal radio 1610 includes a radio communication circuit and an antenna and is communicably connected to terminal-side routers 1500-1 to 1500-$n$ connected to the public network over a radio communication line.

Terminal speaker 1620 converts analog audio data output from terminal audio I/F 1640 into audio and outputs the audio.

Terminal microphone 1630 collects ambient sound, converts the collected sound into analog audio data, and outputs the analog audio data to terminal audio/F 1640.

Terminal audio I/F 1640 converts digital audio data output from terminal controller 1670 into analog audio data, adjusts a signal level of the analog audio data, and outputs the analog audio data to terminal speaker 1620. Further, terminal audio I/F 1640 adjusts a signal level of the analog audio data output from terminal microphone 1630, converts the analog audio data into digital audio data, and outputs the digital audio data to terminal controller 1670. This analog/digital conversion is performed by an A/D, D/A converter (not illustrated).

Note that terminal audio I/F 1640 may output, to terminal controller 1670, data that results from performing predetermined audio compression processing on data that results from digital-converting the analog audio data output from terminal microphone 1630 as digital audio data. Further, when the digital audio data output from terminal controller 1670 corresponds to data that results from performing the predetermined audio compression processing, terminal audio I/F 1640 may first perform predetermined audio extraction processing on the data and then perform the digital/analog conversion on the data thus extracted.

Terminal display 1650 includes a liquid crystal display part of a liquid crystal display with a touch panel and reproduces the digital video data output from terminal controller 1670 to display the video. Note that when the digital video data output from terminal controller 1670 corresponds to data that results from performing predetermined moving picture compression processing, predetermined moving picture extraction processing is performed on the data, and the video is displayed. Further, terminal display 1650 displays a terminal response button and a confirmation button under control of terminal controller 1670.

Touch panel 1660 receives various operations performed on smartphone 1600. For example, when the terminal response button or confirmation button is displayed on terminal display 1650, touch panel 1660 receives a touch operation performed on the terminal response button or confirmation button. When this operation is performed, touch panel 1660 notifies terminal controller 1670 of the occurrence of the operation.

Upon receiving the incoming call notification from the web server, terminal information outputter 1671 of terminal controller 1670 outputs, from terminal speaker 1620, a ringing tone indicating that a visitor is present at the entrance and causes terminal display 1650 to output a display indicating that the visitor is present at the entrance. Note that audio output is performed, for example, by terminal information outputter 1671 outputting a digital audio signal of the ringing tone to terminal audio I/F 1640.

As a result, terminal information outputter 1671 notifies the user of smartphone 1600 that the visitor is present at the entrance. Further, terminal information outputter 1671 causes terminal display 1650 to display the above-described terminal response button.

Further, call controller 1672 of terminal controller 1670 receives the incoming call notification, and when a response operation is performed on smartphone 1600 by the user, transmits the response instruction to master 1200 to start a call between smartphone 1600 and slave 1300 via master 1200. The response operation is, for example, a touch operation on the terminal response button displayed on terminal display 1650.

Further, terminal controller 1670 periodically generates the IP address notification, and transmits the IP address notification thus generated from terminal radio 1610 to master 1200.

Note that these functional sections of terminal controller 1670 are implemented by, for example, dedicated application software preinstalled in smartphone 1600. Further, terminal controller 1670 performs the above-described transmission and reception of various kinds of information between the web server and master 1200 via terminal radio 1610.

Such a configuration causes smartphone 1600 to periodically transmit the IP address notification to master 1200.

<Master Operation>

Figure 14:
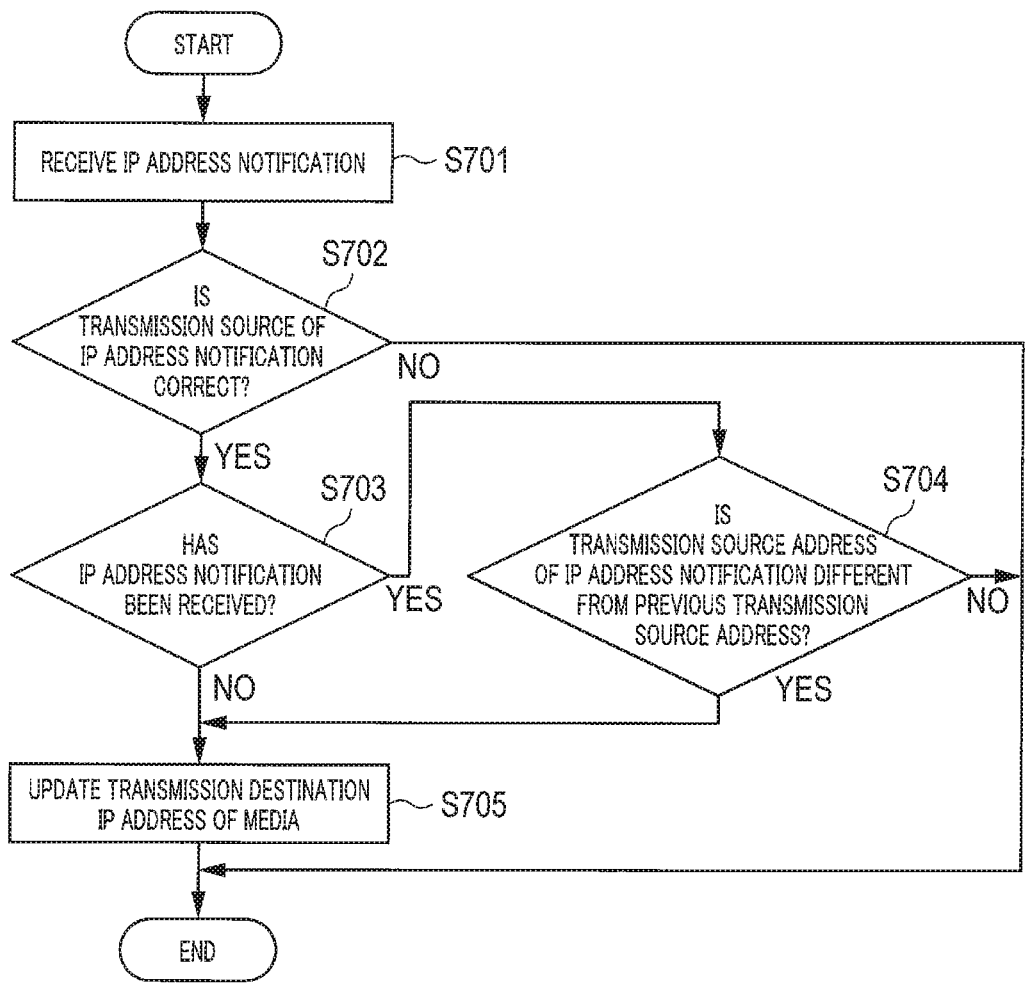
FIG. 14 is a flowchart illustrating a procedure for the master to update a transmission destination IP address of media data.

FIG. 14 is a flowchart illustrating a procedure for master 1200 to update the transmission destination IP address of media data. In step S701, master-side controller 1250 receives the IP address notification transmitted from smartphone 1600. In step S702, master-side controller 1250 determines whether the transmission source of the IP address notification is a genuine apparatus having valid permission or eligibility. When determining that the transmission source is a genuine apparatus (YES), master-side controller 1250 causes the process to proceed to step S703, and when determining that the transmission source is not a genuine apparatus (NO), master-side controller 1250 terminates the process.

In step S703, master-side controller 1250 searches information storing section 1241 to determine whether the IP address notification has been received. When determining that the IP address notification has been received (YES), master-side controller 1250 causes the process to proceed to step S704, and when determining that the IP address notification has yet to be received (NO), master-side controller 1250 causes the process to proceed to step S705.

In step S704, master-side controller 1250 determines whether the transmission source address of the IP address notification received in step S701 is different from the transmission source address of the IP address notification previously received and stored in information storing section 1241. When determining that the transmission source addresses are different from each other (YES), master-side controller 1250 causes the process to proceed to step S705, and when determining that the transmission source addresses are not different from each other (NO), master-side controller 1250 terminates the process.

In step S705, master-side controller 1250 updates the transmission destination IP address of media data to the transmission source address of the IP address notification received in step S701 and transmits the media data.

As described above, according to Embodiment 3, smartphone 1600 periodically transmits the IP address notification including its own IP address to master 1200 via one of terminal-side routers 1500-1 to 1500-n to which smartphone 1600 has been connected, and master 1200 sets the transmission source of the IP address received most recently as the transmission destination of media data, which makes it possible to continue the communication between master 1200 and smartphone 1600 even when smartphone 1600 performs handover during the communication.

Embodiment 4

Figure 15:
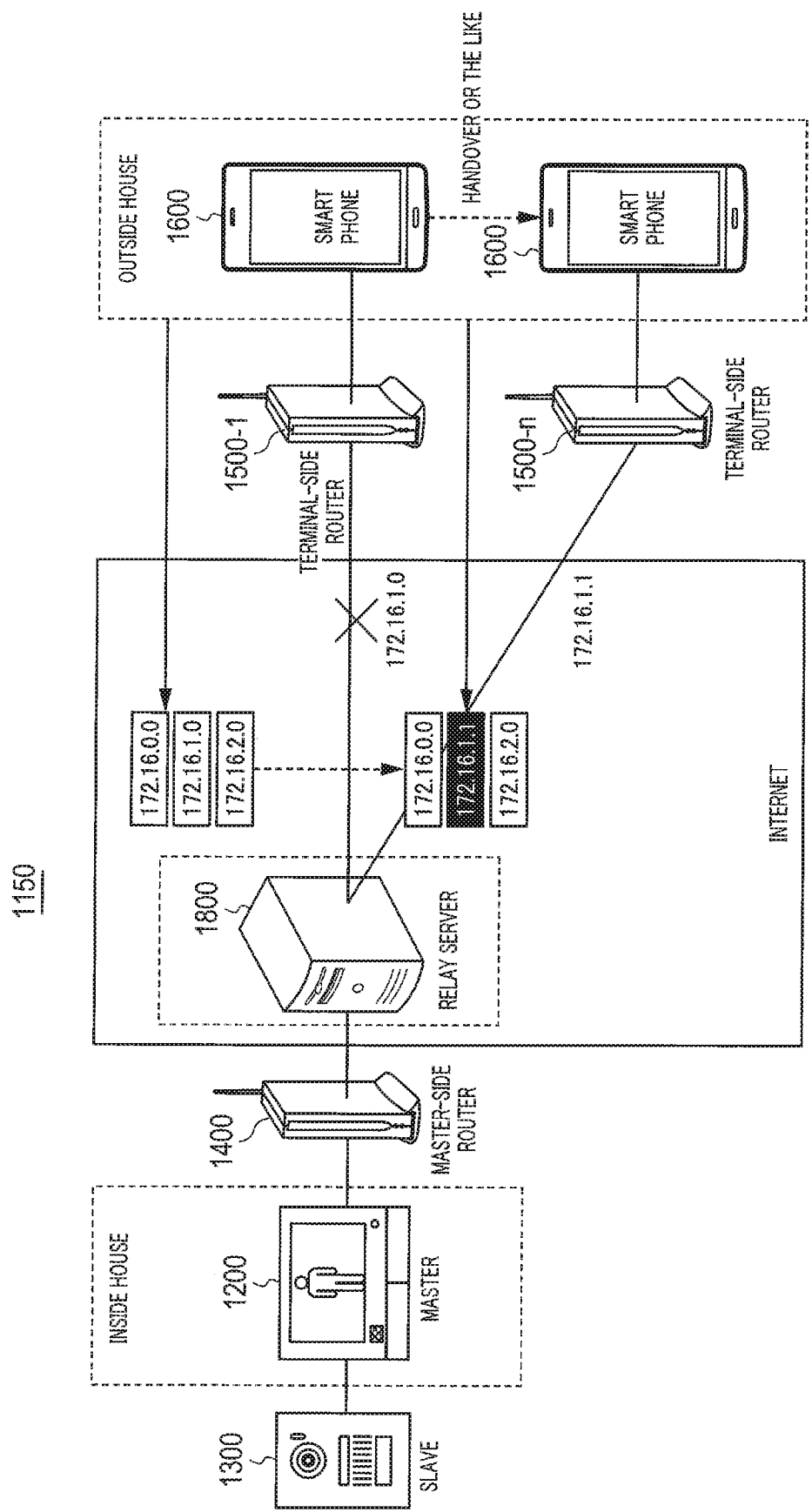
FIG. 15 is a schematic diagram illustrating a configuration of a door phone system according to Embodiment 4 of the present disclosure.

FIG. 15 is a schematic diagram illustrating a configuration of door phone system 1150 according to Embodiment 4 of the present disclosure. FIG. 15 differs from FIG. 10 in that relay server 1800 is additionally provided.

Relay server 1800 is a server that is provided on the Internet and is interposed between master-side router 1400 and terminal-side routers 1500-1 to 1500-n to establish connection between master-side router 1400 and terminal-side routers 1500-1 to 1500-n. Further, relay server 1800 manages an IP address notification transmitted from smartphone 1600, and, with a transmission source of the IP address notification, that is, a route along which media data including audio data and video data received from master 1200.

The installation of relay server 1800 eliminates the need for the above-described function of master 1200 described in Embodiment 3 from master 1200 according to Embodiment 4 of the present disclosure.

Figure 16:
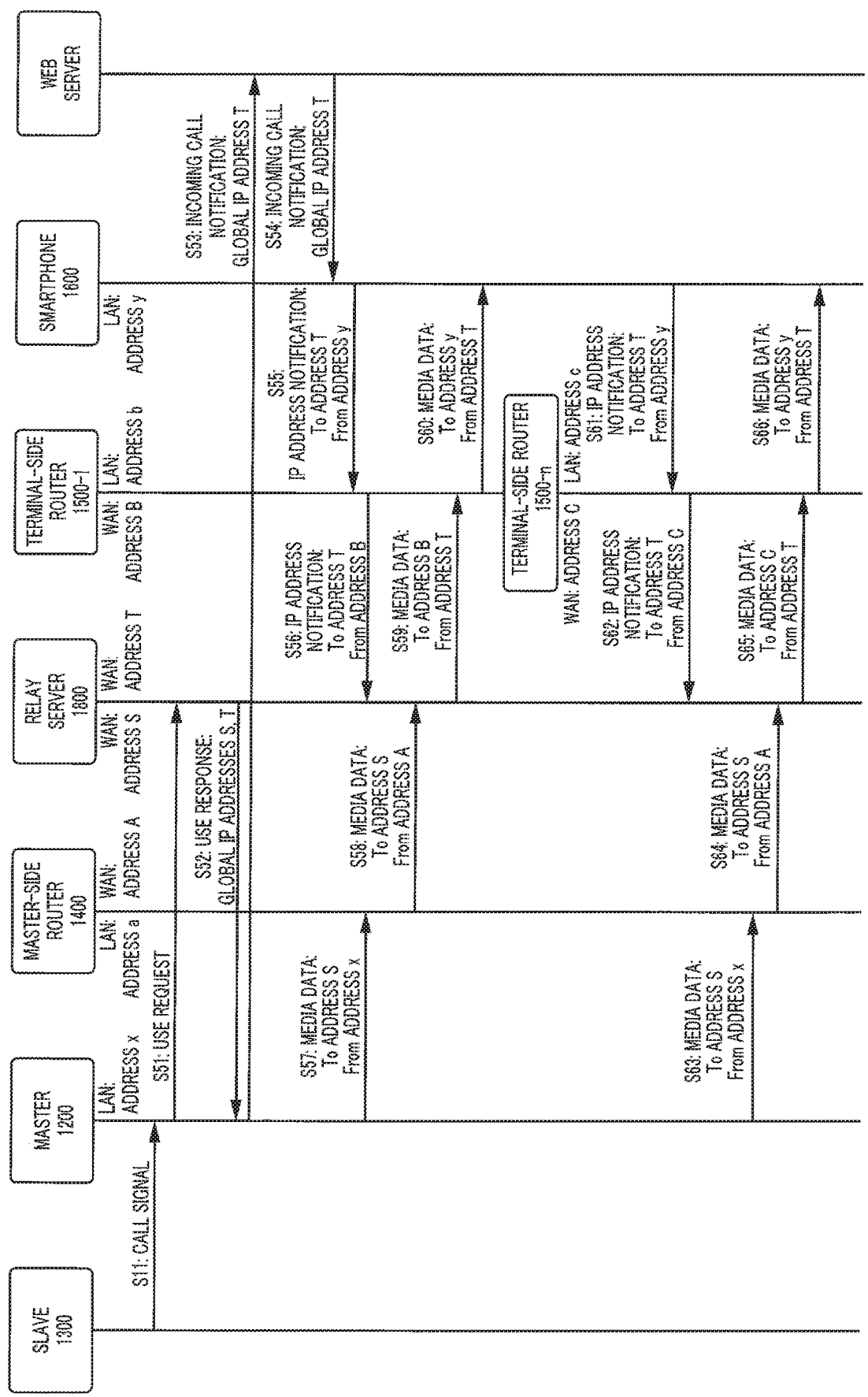
FIG. 16 is a sequence diagram illustrating a communication procedure when a smartphone performs handover.

A description will be given below with reference to FIG. 16 of a communication procedure when smartphone 1600 performs handover in door phone system 1150 described above.

In step S11, slave 1300 receives a call operation from a visitor and transmits a call signal to master 1200.

In step S51, master 1200 transmits a use request to relay server 1800. In step S52, relay server 1800 notifies master 1200 of its own global IP addresses (here, address S, address T) with a use response.

In step S53, master 1200 transmits, to a web server (not illustrated in FIG. 15), an incoming call notification indicating that a call has arrived from slave 1300. The incoming call notification includes a local IP address of slave 1200 preliminarily acquired and the global IP address of relay server 1800. In step S54, the web server transmits the incoming call notification to smartphone 1600.

In step S55, smartphone 1600 transmits the IP address notification for notifying relay server 1800 of its own IP address to terminal-side router 1500-1. In step S56, terminal-side router 1500-1 transmits the IP address notification received from smartphone 1600 to relay server 1800.

In step S57, master 1200 transmits media data such as audio data and video data to master-side router 1400. In step S58, master-side router 1400 transmits the media data received from master 1200 to relay server 1800.

In step S59, relay server 1800 transmits, to terminal-side router 1500-1, the media data that has been received from master-side router 1400 and is addressed to the transmission source of the IP address notification. In step S60, terminal-side router 1500-1 transmits the media data received from relay server 1800 to smartphone 1600.

Here, it is assumed that smartphone 1600 performs handover from terminal-side router 1500-1 to terminal-side router 1500-n. This prevents the media data addressed to smartphone 1600 from reaching smartphone 1600.

In step S61, smartphone 1600 transmits, to terminal-side router 1500-n to which the handover has been performed, an IP address notification addressed to master 1200. In step S62, terminal-side router 1500-n transmits the IP address notification received from smartphone 1600 to relay server 1800. At this time, relay server 1800 determines that the IP address notification received from terminal-side router 1500-n is different from the IP address notification received in step S56, and changes the transmission destination IP address of the media data.

In step S63, master 1200 transmits the media data to master-side router 1400. In step S64, master-side router 1400 transmits the media data received from master 1200 to relay server 1800.

In step S65, relay server 1800 transmits the media data received from master-side router 1400 to terminal-side router 1500-n. In step S66, terminal-side router 1500-n transmits the media data received from relay server 1800 to smartphone 1600.

As described above, even when smartphone 1600 performs handover from terminal-side router 1500-1 to terminal-side router 1500-n, the periodical transmission of the IP address notification to relay server 1800 allows smartphone 1600 to receive the media data from master 1200 via relay server 1800.

Figure 17:
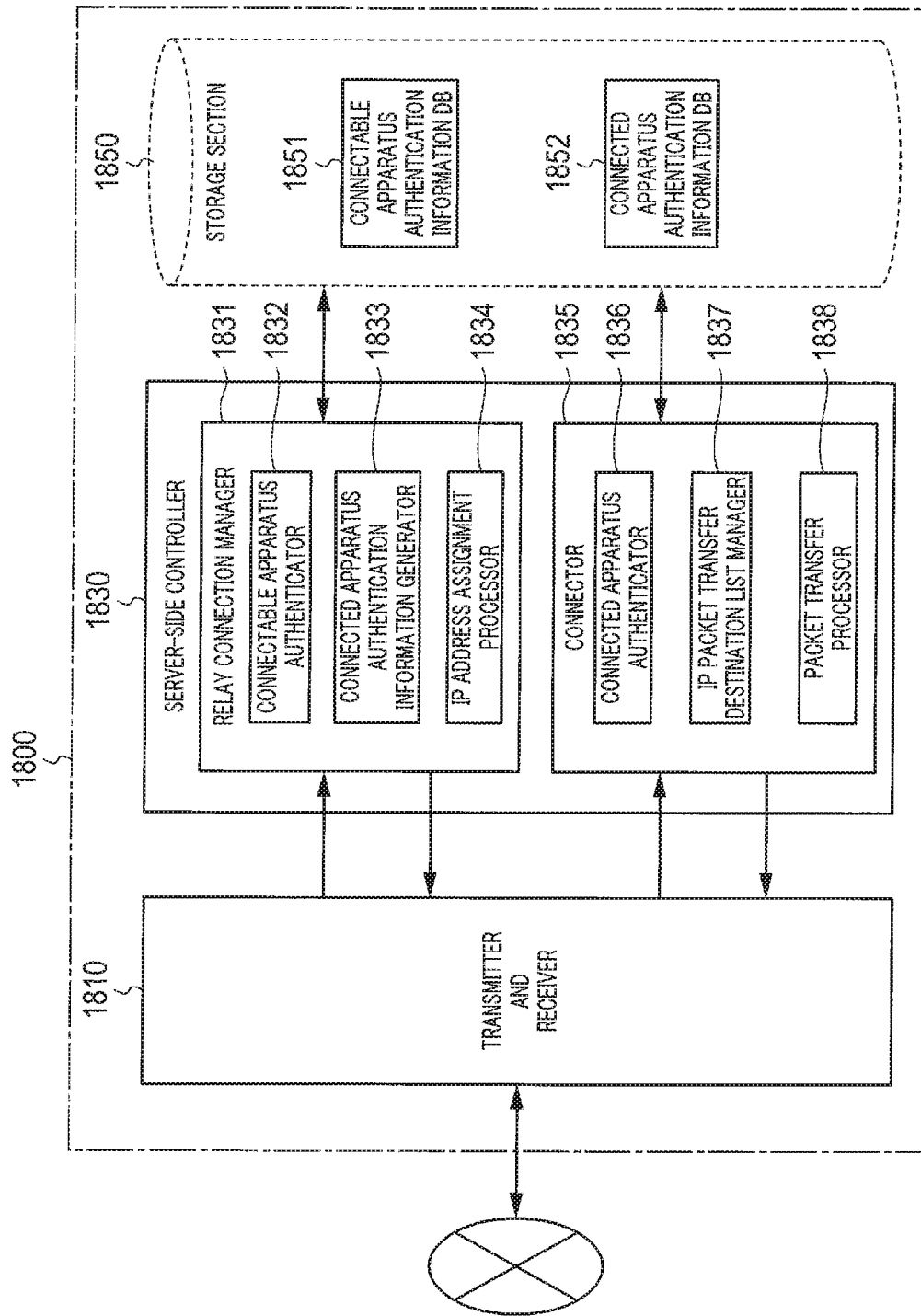
FIG. 17 is a block diagram illustrating an example of a configuration of a relay server.

FIG. 17 is a block diagram illustrating an example of a configuration of relay server 1800.

In FIG. 17, relay server 1800 includes transmitter and receiver 1810, server-side controller 1830, and storage section 1850.

Transmitter and receiver 1810 is communicably connected to master-side router 1400 and terminal-side routers 1500-1 to 1500-n over the Internet.

Server-side controller 1830 includes relay connection manager 1831 and connector 1835, and comprehensively controls relay server 1800.

Relay connection manager 1831 includes connectable apparatus authenticator 1832, connected apparatus authentication information generator 1833, and IP address assignment processor 1834. Upon receiving the use request from master 1200, relay connection manager 1831 assigns a global IP address to each of master-side router 1400 and terminal-side routers 1500-1 to 1500-n.

In response to the use request from master 1200, connectable apparatus authenticator 1832 performs authentication on master 1200 that has transmitted the use request to determine whether master 1200 is a genuine apparatus having use permission or eligibility based on connectable apparatus authentication information database (DB) 1851 stored in storage section 1850. Connectable apparatus authenticator 1832 outputs a result of the authentication to connected apparatus authentication information generator 1833.

Upon acquiring a result indicating success in the authentication from connectable apparatus authenticator 1832, connected apparatus authentication information generator 1833 generates authentication information (connected apparatus authentication information) for a relay connection session to be established with master 1200 that has transmitted the use request. This authentication information is notified to smartphone 1600 from master 1200 that has transmitted the use request and then used. Note that master 1200 also generates connected apparatus authentication information.

IP address assignment processor 1834 assigns a global IP address that is a server resource to each of master-side router 1400 and terminal-side routers 1500-1 to 1500-n.

Connector 1835 includes connected apparatus authenticator 1836, IP packet transfer destination list manager 1837, and packet transfer processor 1838. Connector 1835 transfer an IP packet that is addressed to the global IP address assigned by relay connection manager 1831 and has arrived at master-side router 1400 to one of terminal-side routers 1500-1 to 1500-n, and transfers an IP packet that is addressed to the global IP address assigned by relay connection manager 1831 and has arrived at one of terminal-side routers 1500-1 to 1500-n to master-side router 1400. This enables an IP packet relay function over the network.

Connected apparatus authenticator 1836 performs authentication on the IP packet that is addressed to the global IP address assigned by relay connection manager 1831 using the authentication information generated by connected apparatus authentication information generator 1833.

IP packet transfer destination list manager 1837 manages a list in which the transmission source address of the IP packet that arrives at the global IP address of one of terminal-side routers 1500-1 to 1500-n from smartphone 1600 is associated with the transfer destination of the IP packet that arrives at the global IP address of master-side router 1400 from master 1200.

Packet transfer processor 1838 transfers the packet received from master 1200 to smartphone 1600 and transfers the packet received from smartphone 1600 to master 1200 based on the list managed by IP packet transfer destination list manager 1837.

Storage section 1850 has connectable apparatus authentication information database 1851 and connected apparatus authentication information database 1852. Appropriate authentication information is registered in these databases by relay connection manager 1831, and authentication information is retrieved from these databases as necessary.

Figure 18:
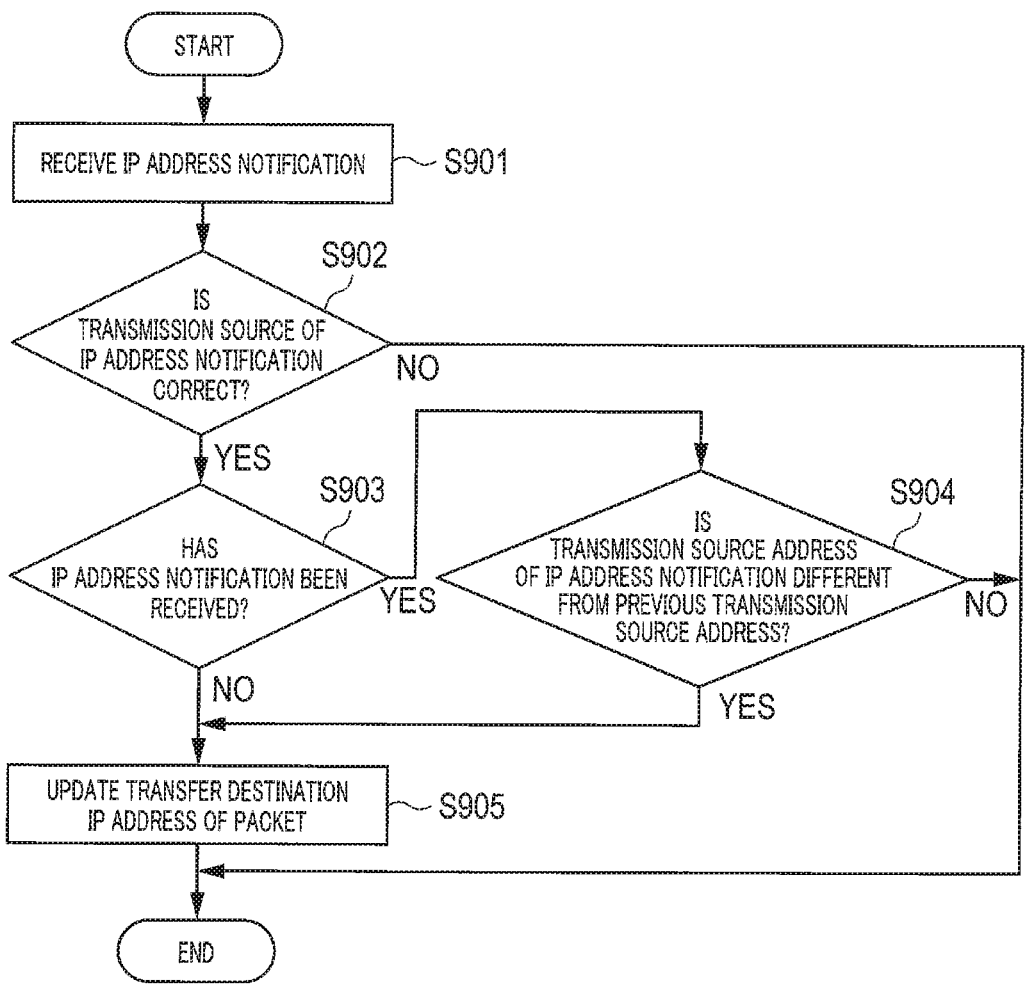
FIG. 18 is a flowchart illustrating a procedure for the relay server to update a transmission destination IP address of media data.

FIG. 18 is a flowchart illustrating a procedure for relay server 1800 to update the transmission destination IP address of media data. In step S901, server-side controller 1830 receives the IP address notification transmitted from smartphone 1600. In step S902, server-side controller 1830 determines whether the transmission source of the IP address notification is a genuine apparatus having valid permission or eligibility. When determining that the transmission source is a genuine apparatus (YES), server-side controller 1830 causes the process to proceed to step S903, and when determining that the transmission source is not a genuine apparatus (NO), server-side controller 1830 terminates the process.

In step S903, server-side controller 1830 searches IP packet transfer destination list manager 1837 to determine whether the IP address notification has been received. When determining that the IP address notification has been received (YES), server-side controller 1830 causes the process to proceed to step S904, and when determining that the IP address notification has yet to be received (NO), server-side controller 1830 causes the process to proceed to step S905.

In step S904, server-side controller 1830 determines whether the transmission source address of the IP address notification received in step S901 is different from the transmission source address of the IP address notification previously received and stored in P packet transfer destination list manager 1837. When determining that the transmission source addresses are different from each other (YES), server-side controller 1830 causes the process to proceed to step S905, and when determining that the transmission source addresses are not different from each other (NO), server-side controller 1830 terminates the process.

In step S905, server-side controller 1830 updates the transmission destination IP address of media data to the transmission source address of the IP address notification received in step S901 and transmits the media data.

As described above, according to Embodiment 4, smartphone 1600 periodically transmits the IP address notification including its own IP address to relay server 1800 via one of terminal-side routers 1500-1 to 1500-n to which smartphone 1600 has been connected, and relay server 1800 sets the transmission source of the IP address received most recently as the transfer destination of media data from master 1200, which makes it possible to continue the communication between master 1200 and smartphone 1600 even when smartphone 1600 performs handover during the communication.

Note that, in each of the above-described embodiments, the description has been given with a smartphone serving as an example of the mobile terminal apparatus, but the present disclosure is not limited to such a configuration. For example, a tablet terminal, a laptop personal computer, a wearable terminal, or the like may be used as the mobile terminal apparatus, and any terminal having at least a call function and a push notification receiving function may be used.

This application claims priority based on Japanese Patent Application No. 2016-171219 filed on Sep. 1, 2016. The contents described in the application specification and drawings are all incorporated herein by reference.

INDUSTRIAL APPLICABILITY

The present disclosure is useful for handover between a hub and a mobile terminal apparatus outside a house during communication.

REFERENCE SIGNS LIST 100, 150 Camera system
200 Hub
210 Master-side cable connector
230 Information storing section
240 Master-side radio
250 Master-side controller
251 Incoming call notifier
252 Call relay
260 Master-side packet former
270 Master-side transmission driver
280 Master-side reception driver
290 Master-side data extractor
300 DECT camera
400 Master-side router
500-1 to 500-n Terminal-side router
600 Smartphone
610 Terminal radio
620 Terminal speaker
630 Terminal microphone
640 Terminal audio I/F
650 Terminal display
660 Touch panel
670 Terminal controller
671 Terminal information outputter
672 Call controller
800 Relay server
810 Transmitter and receiver
830 Server-side controller
831 Relay connection manager
832 Connectable apparatus authenticator
833 Connected apparatus authentication information generator
834 IP address assignment processor
835 Connector
836 Connected apparatus authenticator
837 IP packet transfer destination list manager
838 Packet transfer processor
850 Storage section
851 Connectable apparatus authentication information database
852 Connected apparatus authentication information database
1100, 1150 Door phone system
1200 Master
1202 Master-side speaker
1203 Master-side microphone
1210 Master-side cable connector
1220 Master-side key inputter
1230 Master-side audio I/F
1240 Master-side display
1241 Information storing section
1242 Master-side radio
1250 Master-side controller
1251 Incoming call notifier
1252 Call relay
1260 Master-side packet former
1270 Master-side transmission driver
1280 Master-side reception driver
1290 Master-side data extractor
1300 Slave
1400 Master-side router
1500-1 to 1500-n Terminal-side router
1600 Smartphone
1610 Terminal radio
1620 Terminal speaker
1630 Terminal microphone
1640 Terminal audio I/F
1650 Terminal display
1660 Touch panel
1670 Terminal controller
1671 Terminal information outputter
1672 Call controller
1800 Relay server
1810 Transmitter and receiver
1830 Server-side controller
1831 Relay connection manager
1832 Connectable apparatus authenticator
1833 Connected apparatus authentication information generator
1834 IP address assignment processor
1835 Connector
1836 Connected apparatus authenticator
1837 IP packet transfer destination list manager
1838 Packet transfer processor
1850 Storage section
1851 Connectable apparatus authentication information database
1852 Connected apparatus authentication information database

The invention claimed is:

1. A camera system, comprising:
an imaging apparatus that transmits media data including at least one of audio data or video data; and
a communication apparatus that receives the media data transmitted from the imaging apparatus, periodically receives an IP address notification from a mobile terminal apparatus preliminarily associated with the communication apparatus, and transmits the media data to a transmission source of the IP address notification received most recently,
wherein the communication apparatus transmits an incoming notification call to the mobile terminal apparatus via a web server when a call arrives from the imaging apparatus, and
the mobile terminal apparatus transmits the IP address notification to the communication apparatus based on the incoming notification call.

2. The camera system according to claim 1, wherein the communication apparatus includes:
a memory that stores the IP address notification received from the mobile terminal apparatus preliminarily associated with the communication apparatus;
a controller that compares, as a comparison, a transmission source of an IP address notification newly received from the mobile terminal apparatus with a transmission source of an IP address notification previously received and stored, and, when the comparison results in no match, updates the transmission source of the IP address notification newly received to a transmission destination of the media data including the at least one of the audio data or the video data; and a transmitter that transmits the media data to the transmission destination.

3. The camera system according to claim 1, further comprising a server apparatus that relays a communication between the communication apparatus and the mobile terminal apparatus associated with the communication apparatus, wherein the server apparatus includes:

a transfer destination list manager that manages a list in which a transmission source address of an IP packet that arrives from a terminal side is associated with a global IP address of a terminal-side router that connects the server apparatus and the mobile terminal apparatus, and a transfer destination of an IP packet that arrives from the communication apparatus is associated with a global IP address of a master-side router that connects the server apparatus and the communication apparatus; and a processor that transfers the IP packet based on the list.

4. The camera system according to claim 1, wherein the imaging apparatus is a digital enhanced cordless telecommunications (DECT) camera; and the communication apparatus is a hub.

5. The camera system according to claim 1, wherein the camera system is a door phone system;

the imaging apparatus is an entrance slave; and the communication apparatus is a master.

6. A communication method comprising:

causing an imaging apparatus to transmit media data including at least one of audio data or video data; and causing the communication apparatus to receive the media data transmitted from the imaging apparatus and an IP address notification transmitted from a mobile terminal apparatus preliminarily associated with the communication apparatus and to transmit the media data to a transmission source of the IP address notification received most recently, wherein the communication apparatus transmits an incoming notification call to the mobile terminal apparatus via a web server when a call arrives from the imaging apparatus, and the mobile terminal apparatus transmits the IP address notification to the communication apparatus based on the incoming notification call.

* * * * *